US012572183B2

(12) United States Patent
Nagai et al.

(10) Patent No.: US 12,572,183 B2
(45) Date of Patent: Mar. 10, 2026

(54) ROTATING SHAFT MECHANISM AND ELECTRONIC DEVICE

(71) Applicant: Huawei Technologies Co., Ltd., Shenzhen (CN)

(72) Inventors: Kenji Nagai, Yokohama (JP); Akio Ishiguro, Yokohama (JP); Yake Zou, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 197 days.

(21) Appl. No.: 18/609,618

(22) Filed: Mar. 19, 2024

(65) Prior Publication Data

US 2024/0219978 A1     Jul. 4, 2024

Related U.S. Application Data

(63) Continuation of application No. PCT/CN2021/121713, filed on Sep. 29, 2021.

(51) Int. Cl.
*G06F 1/16* (2006.01)

(52) U.S. Cl.
CPC .......... *G06F 1/1681* (2013.01); *G06F 1/1652* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 10,268,245 | B2 * | 4/2019 | Lin | ...................... | G06F 1/1616 |
| 11,336,759 | B2 * | 5/2022 | Liao | ..................... | H04M 1/022 |
| 11,846,997 | B2 * | 12/2023 | Liao | ................... | H04M 1/0216 |
| 12,032,416 | B2 * | 7/2024 | Feng | .................... | G06F 1/1652 |
| 12,368,792 | B2 * | 7/2025 | Gao | ..................... | G06F 1/1652 |
| 2024/0069604 | A1 * | 2/2024 | Xu | ......................... | G06F 1/1652 |
| 2024/0219978 | A1 * | 7/2024 | Nagai | ................ | H04M 1/0237 |
| 2024/0338058 | A1 * | 10/2024 | Xu | ......................... | G06F 1/1652 |
| 2025/0207628 | A1 * | 6/2025 | Lin | ...................... | G06F 1/1616 |

FOREIGN PATENT DOCUMENTS

| | | |
|---|---|---|
| CN | 111692196 A | 9/2020 |
| CN | 111698355 A | 9/2020 |

* cited by examiner

*Primary Examiner* — Lisa Lea-Edmonds
(74) *Attorney, Agent, or Firm* — WOMBLE BOND DICKINSON (US) LLP

(57) ABSTRACT

A rotating shaft mechanism (1) includes a length maintaining mechanism (1*a*) and a main shaft assembly (1*b*). The length maintaining mechanism (1*a*) includes a fastening member (101) and two swing arms (102, 103), and the two swing arms (102, 103) are rotatably connected to the fastening member (101). The swing arm includes a sliding block (1021), a swing rod (1022), and a connecting assembly (1023), and the swing rod (1022) may slide along the sliding block (1021). The swing rod (1022) is rotatably connected to the fastening member (101), and the connecting assembly (1023) is also rotatably connected to the fastening member (101). When the swing rod (1022) rotates relative to the fastening member (101), the connecting assembly (1023) may be driven to rotate around the fastening member (101). The main shaft assembly (1*b*) includes a cover plate (105).

20 Claims, 13 Drawing Sheets

101

ROTATING SHAFT MECHANISM AND ELECTRONIC DEVICE

CROSS-REFERENCE TO RELATED APPLICATIONS

This application is a continuation of International Application No. PCT/CN2021/121713, filed on Sep. 29, 2021, the disclosure of which is hereby incorporated by reference in its entirety.

TECHNICAL FIELD

This application relates to the field of electronic device technologies, and in particular, to a rotating shaft mechanism and an electronic device.

BACKGROUND

With the rapid development of communication and electronic technologies, electronic devices such as mobile phones have become indispensable tools in people's daily lives. Currently, the electronic device provides increasingly diversified functions, and a user also expects to better use the functions by using a larger and wider display. However, the larger display also increases an overall structure of the electronic device. Consequently, the electronic device is less portable and less compact. At a current stage, a flexible display technology is increasingly mature, so that foldable electronic devices can be implemented. The foldable electronic devices are more popular among consumers due to large displays and portability.

A flexible display is a key component in the foldable electronic device and is relatively fragile. If the flexible display is deformed in a folding process, pressure or pulling force on each part of the flexible display is uneven, and the flexible display may be damaged in a serious case. Therefore, how to avoid deformation of the flexible display in a movement process of the foldable electronic device has become a problem to be urgently resolved by a person skilled in the art.

SUMMARY

This application provides a rotating shaft mechanism and an electronic device, to avoid deformation of a flexible display, prolong a service life of the flexible display, and improve reliability of the electronic device.

According to a first aspect, this application provides a rotating shaft mechanism. The rotating shaft mechanism may include a length maintaining mechanism and a main shaft assembly. In this application, there may be a plurality of length maintaining mechanisms, and the plurality of length maintaining mechanisms may be disposed at intervals in a length direction of the rotating shaft mechanism, to improve movement stability of the rotating shaft mechanism. When the length maintaining mechanism is disposed in an embodiment, the length maintaining mechanism may include a fastening member and two swing arms. The two swing arms are respectively disposed on two sides of the fastening member, and are rotatably connected to the fastening member. Each swing arm may include a sliding block, a swing rod, and a connecting assembly. The sliding block may be used as a base of the swing arm, and may be configured to be fixedly connected to a housing of the electronic device. The sliding block may be provided with a sliding slot, and the swing rod may be accommodated in the sliding slot, and may slide in the sliding slot in a direction toward or away from the fastening member. In addition, an end that is of the swing rod and that is away from the fastening member may be rotatably connected to the fastening member. The connecting assembly is located on a side that is of the swing rod and that faces the fastening member. The connecting assembly may also be rotatably connected to the fastening member. The swing rod and the connecting assembly may be connected in a linkage manner, so that the connecting assembly may be driven to rotate around the fastening member when the swing rod rotates relative to the fastening member.

The main shaft assembly may include a cover plate, the cover plate may include two support plates, and each support plate may cover a swing arm disposed on a corresponding side. An end that is of each support plate and that faces the fastening member may be rotatably connected to the connecting assembly, and an end that is of the support plate and that is away from the fastening member may be rotatably connected to the sliding block. With the use of the rotating shaft mechanism provided in this application, in a process in which the connecting assembly rotates relative to the fastening member, the support plate may be driven to move in a direction toward or away from the fastening member. In a process in which the support plate moves, the sliding block and the swing rod may be driven to slide relative to each other in a direction toward or away from the fastening member, so that a distance between the sliding block and the fastening member can be adjusted.

In this application, the main shaft assembly may further include a housing, and a surface of the housing may be used as an appearance surface of the rotating shaft mechanism. In addition, the housing is provided with an accommodating groove, and the length maintaining mechanism may be accommodated in the accommodating groove, so that the housing can protect the length maintaining mechanism.

In addition, the cover plate may further include a main shaft fastening plate, the main shaft fastening plate may be fastened to the housing, the two support plates are respectively disposed on two sides of the main shaft fastening plate, and the fastening member may be located between the main shaft fastening plate and the housing, so that the length maintaining structure is limited to the accommodating groove of the housing by fastening the main shaft fastening plate to the housing.

In this application, to make the swing rod slide stably in the sliding slot, each swing rod may be provided with a protrusion, and the sliding slot may be provided with a sliding rail. The protrusion may be accommodated in the corresponding sliding slot, and may slide in the corresponding sliding slot in a direction toward or away from the fastening member. In this way, sliding cooperation between the protrusion and the sliding rail can provide a guiding function for movement of the swing rod, to improve relative-movement stability of the swing rod and the sliding block. In some other embodiments of this application, alternatively, the protrusion may be disposed in the sliding slot, and the guide rail may be disposed on the swing rod. This can also provide a guiding function for movement of the swing rod and the sliding block.

Each swing rod may be rotatably connected to the fastening member by using a rotating shaft. For example, an end that is of each swing rod and that is away from the sliding block may be provided with a rotating portion, and the fastening member is provided with a first rotating shaft, so that a rotatable connection between each swing rod and the fastening member is implemented through a rotatable connection between the rotating portion and the first rotating shaft. Each swing rod is rotatably connected to the fastening member by using a physical shaft, so that rotation stability of each swing rod can be effectively improved.

In an embodiment of this application, there may be two rotating portions on each swing rod, and the two rotating portions are rotatably connected to the fastening member by using the first rotating shaft, so that stability of rotation between each swing rod and the fastening member can be improved. In addition, the two rotating portions may be disposed at an interval in the length direction of the rotating shaft mechanism, to form first mounting space between the two rotating portions, and at least a part of the connecting assembly may be accommodated in the first mounting space, so that a structure of the rotating shaft mechanism is compact. This helps reduce a volume of the rotating shaft mechanism and implement a miniaturization embodiment of the electronic device that uses the rotating shaft mechanism.

When each connecting assembly is disposed in an embodiment, each connecting assembly may include a first connecting member and a second connecting member, and the second connecting member may be disposed between the first connecting member and the swing rod. It can be learned from the foregoing descriptions that, each connecting assembly is rotatably connected to the fastening member. For example, the fastening member may be provided with a second rotating shaft, and the first connecting member may be rotatably connected to the second rotating shaft. The first connecting member is further provided with a first long hole and a second long hole, the second rotating shaft may be located between the first long hole and the second long hole, and the first long hole is located, relative to the second long hole, at an end that is of the first connecting member and that faces the fastening member. The rotating portion may be connected to the first connecting member by using a third rotating shaft that passes through the first long hole. In a process in which the rotating portion rotates around the first rotating shaft, the third rotating shaft may slide along the first long hole, to drive the first connecting member to rotate around the second rotating shaft.

In this application, an end part that is of the first connecting member and that is away from the fastening member may be provided with a connecting portion, and the connecting portion may be configured to be rotatably connected to the second rotating shaft. In addition, there may be two connecting portions, and the two connecting portions are disposed at an interval in the length direction of the rotating shaft mechanism, to form second mounting space between the two connecting portions. At least a part of the second connecting member may be accommodated in the second mounting space, so that the structure of the rotating shaft mechanism is compact. This helps reduce the volume of the rotating shaft mechanism and implement the miniaturization embodiment of the electronic device that uses the rotating shaft mechanism.

In addition, the second connecting member is rotatably connected to the fastening member, the fastening member is further provided with a fourth rotating shaft, and the second connecting member is rotatably connected to the fourth rotating shaft. The second connecting member is further connected to the first connecting member by using a fifth rotating shaft that passes through the second long hole of the first connecting member. In a process in which the first connecting member rotates around the second rotating shaft, the fifth rotating shaft may slide along the second long hole, to drive the second connecting member to rotate around the fourth rotating shaft.

In this application, a connection between the connecting assembly and the support plate may be implemented through a connection between the second connecting member and the support plate. For example, the second connecting member is rotatably connected, by using a sixth rotating shaft, to an end part that is of the support plate and that faces the fastening member. In this way, when the second connecting member rotates around the fourth rotating shaft, the support plate is driven to rotate relative to the sliding block, so that the support plate is driven to move in a direction toward or away from the fastening member. In a process in which the support plate moves, the sliding block and the swing rod may be driven to slide relative to each other in a direction toward or away from the fastening member, so that a distance between the sliding block and the fastening member can be adjusted.

In this application, in addition to the foregoing disposition manner, the connecting assembly may alternatively be disposed in another disposition manner. For example, in an embodiment of this application, the connecting assembly may be of an integrated structure. The fastening member may be provided with a second rotating shaft, and the connecting assembly of the integrated structure may be rotatably connected to the second rotating shaft. In addition, the connecting assembly is provided with a long hole, and the rotating portion of the swing rod may be connected to the connecting assembly by using a third rotating shaft. For example, the third rotating shaft may pass through the first rotating shaft and the long hole. In this way, in a process in which the rotating portion rotates, the third rotating shaft may slide along the long hole, to drive the connecting assembly to rotate around the second rotating shaft.

There may be two long holes on the connecting assembly, and the second rotating shaft may be located between the two long holes. In addition, there may be two rotating portions on the swing rod, and in the length direction of the rotating shaft mechanism, the two rotating portions are respectively connected to the two long holes in a one-to-one correspondence by using the third rotating shaft. The swing rod is connected to the connecting assembly by using the two rotating portions. This can help improve reliability of moving with the swing rod by the connecting assembly, and improve movement stability of the entire rotating shaft mechanism.

In this application, the connecting assembly may be rotatably connected to an end part that is of the support plate and that faces the fastening member. In this way, in a process in which the connecting assembly rotates around the second rotating shaft, the support plate may be driven to rotate relative to the sliding block, so that the support plate is driven to move in a direction toward or away from the fastening member. In a process in which the support plate moves, the sliding block and the swing rod may be driven to slide relative to each other in a direction toward or away from the fastening member, so that a distance between the sliding block and the fastening member can be adjusted.

In addition, in this embodiment of this application, the rotating portion may rotate synchronously with the first rotating shaft, and a cross section of the first rotating shaft is a special-shaped cross section. The cross section of the first rotating shaft is set to the special-shaped cross section, so that a rotation position of the first rotating shaft can be adjusted by adjusting the special-shaped cross section.

According to a second aspect, this application further provides an electronic device. The electronic device includes a flexible display, two housings, and the rotating shaft mechanism in the first aspect. The two housings may be respectively disposed on two sides of the rotating shaft mechanism, and the sliding block of the swing arm of the length maintaining mechanism may be fixedly connected to a housing on a corresponding side. The flexible display may continuously cover the two housings and the rotating shaft mechanism, and the flexible display may be fixedly connected to the two housings.

With the use of the electronic device provided in this application, because the first swing arm and the second swing arm of the rotating shaft mechanism are rotatably connected to the fastening member by using physical shafts, rotation stability of the rotating shaft mechanism can be improved, so that movement stability of the electronic device can be improved. In addition, in a process in which the first housing and the second housing of the electronic device rotate relative to each other, a distance between the first housing or the second housing and the fastening member can be adjusted through relative sliding of the sliding block and the corresponding swing rod of the length maintaining mechanism, to prevent the flexible display fastened to the first housing and the second housing from being squeezed or pulled, prolong a service life of the flexible display, and improve reliability of the electronic device.

In an embodiment of this application, an end part that is of each housing and that faces the fastening member is provided with an opening groove, and the sliding block of the swing arm may be located in an opening groove on a corresponding side, and is fixedly connected to a groove wall of the opening groove.

In addition, when the electronic device is in an opened state, opening grooves of the two housings may be aligned and combined to form an accommodating portion, and the rotating shaft mechanism may be hidden in the accommodating portion. In this way, the electronic device can have appearance effect of an integrated embodiment, so that appearance aesthetics of the electronic device is improved.

In this application, a rotation position of the support plate around the sliding block may be limited, to connect a surface of the support plate to a surface of the housing to form a flat support surface when the electronic device is in the opened state. For example, a first support plate may be provided with a first limiting portion, the sliding block is provided with a second limiting portion, and the first limiting portion is disposed to correspond to the second limiting portion. The first limiting portion may be a notch, and the second limiting portion may be a protruding portion. Alternatively, the first limiting portion may be a protruding portion, and the second limiting portion may be a notch. In this way, the protruding portion may be accommodated in the notch, so that the protruding portion is snapped into the notch to limit a rotation position of the first support plate.

REFERENCE NUMERALS

1: rotating shaft mechanism; 1a: length maintaining mechanism; 101: fastening member; 1011: first rotating shaft; 1012: second rotating shaft;

1013: third rotating shaft; 1014: fourth rotating shaft; 1015: fifth rotating shaft; 1016: sixth rotating shaft; 1017: seventh rotating shaft;

1018: first mounting groove; 10181: groove hole;

102: swing arm; 1021: sliding block; 10211: sliding slot; 102111: sliding rail; 10212: second limiting portion;

1022: first swing rod; 10221: protrusion; 10222: rotating portion; 10222a: first mounting hole;

10222*b*: second mounting hole; 10222*c*: third mounting hole; 10223: first mounting space; 1023: connecting assembly;

10231: first connecting member; 10231A: first mounting hole; 10231B: second mounting hole; 10231C: third mounting hole;

102311: connecting portion; 102312: second mounting space; 10232: second connecting member; 102321: first mounting hole;

102322: second mounting hole; 102323: third mounting hole;

103: second swing arm; 1031: sliding block; 1032: swing rod; 1033: connecting assembly;

1*b*: main shaft assembly; 104: housing; 1041: accommodating groove; 105: cover plate; 1051: main shaft fastening plate; 10511: support portion;

1052: first support plate; 10521: first limiting portion; 1053: second support plate;

1*c*: synchronous damper assembly; 106: first rotating arm; 1061: first gear; 1061*a*: first cam structure;

1061*b*: second cam structure; 107: second rotating arm; 1071: second gear; 108: first fastening portion;

1081: first cavity structure; 109: second fastening portion; 1091: second cavity structure; 110: driven gear;

111: first conjoined cam; 112: second conjoined cam; 113: first gear shaft; 114: second gear shaft;

115: first stopper; 116: first elastic member; 117: second elastic member; 118: second stopper;

119: intermediate gear shaft; 120: third elastic member;

2: first housing; 2*a*: first surface; 2*b*: second surface; 201: first opening groove; 3: second housing; 3*a*: first surface;

3*b*: second surface; 301: second opening groove; 4: flexible display.

DESCRIPTION OF EMBODIMENTS

To make objectives, technical solutions, and advantages of this application clearer, the following further describes this application in detail with reference to accompanying drawings.

Figure 1A:
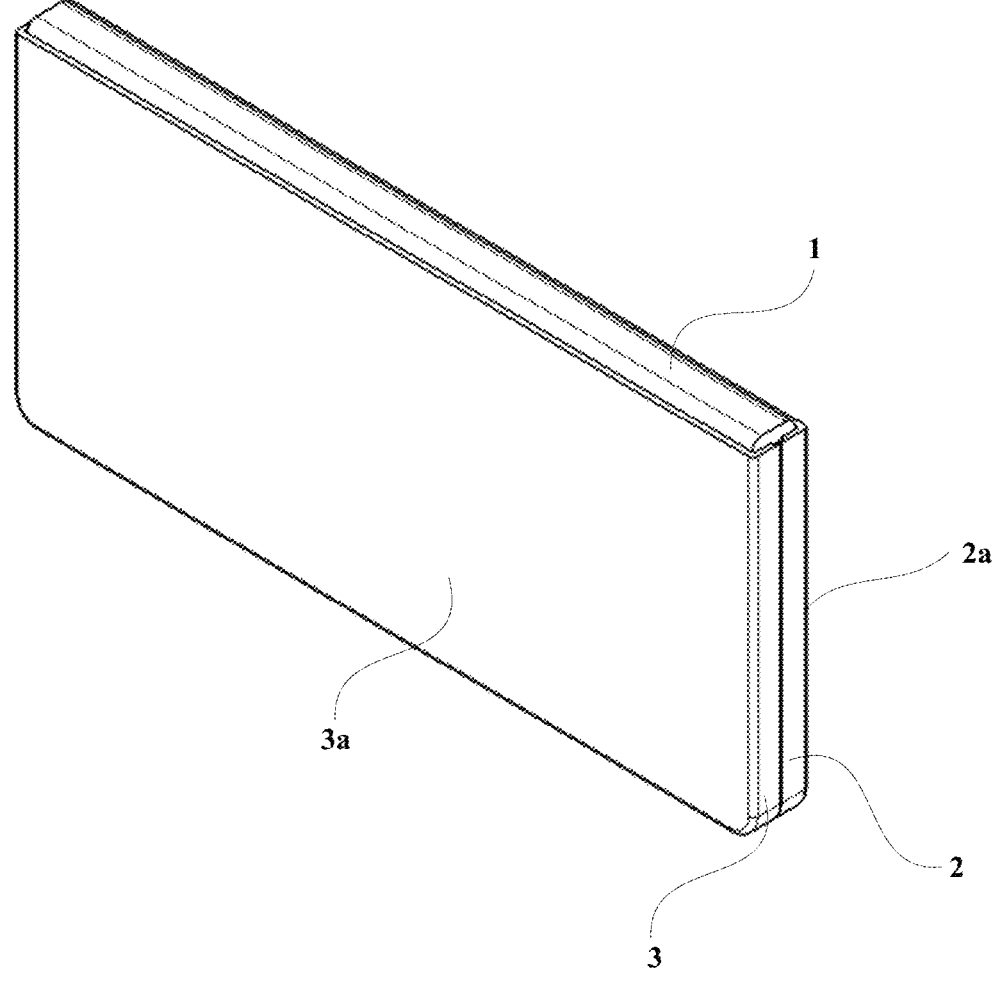
FIG. 1a is a schematic diagram of a structure of an electronic device in a closed state according to an embodiment of this application.

For ease of understanding a rotating shaft mechanism 1 provided in embodiments of this application, the following first describes application scenarios of the rotating shaft mechanism 1. The rotating shaft mechanism 1 may be used in a foldable electronic device, including but not limited to a mobile phone, a palmtop computer (or a personal digital assistant (PDA)), a notebook computer, a tablet computer, or the like. For use of the rotating shaft mechanism 1 provided in embodiments of this application in an electronic device, refer to FIG. 1*a*. FIG. 1*a* is a schematic diagram of a structure of an electronic device according to an embodiment of this application. In addition to the rotating shaft mechanism 1, the electronic device may usually further include two housings and a flexible display (not shown in FIG. 1*a*). In this application, for ease of description, the two housings may be respectively denoted as a first housing 2 and a second housing 3. The first housing 2 and the second housing 3 are located on two sides of the rotating shaft mechanism 1, and may rotate relative to each other around the rotating shaft mechanism 1. During use, the electronic device may be closed and opened based on different use scenarios. In the embodiment shown in FIG. 1*a*, the electronic device is in a closed state, and FIG. 1*a* shows a relative position relationship between the rotating shaft mechanism 1 and the two housings when the electronic device is in the closed state. In this case, a surface of the rotating shaft mechanism 1, a first surface 2*a* of the first housing 2, and a first surface 3*a* of the second housing 3 may be jointly used as an appearance surface of the electronic device. The first surface 2*a* of the first housing 2 is a surface that is of the first housing 2 and that is away from the flexible display, and the first surface 3*a* of the second housing 3 is a surface that is of the second housing 3 and that is away from the flexible display.

Figure 1B:
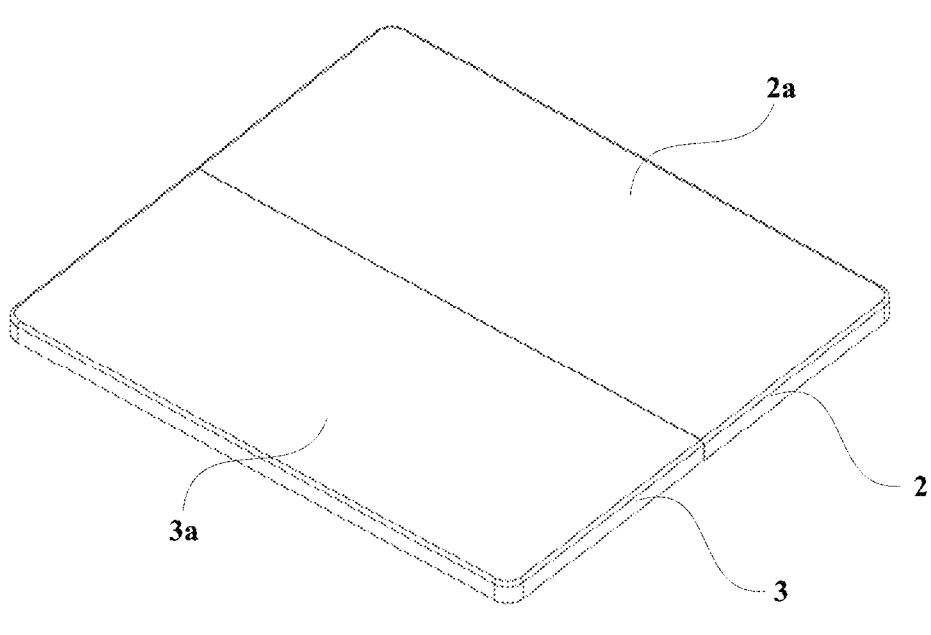
FIG. 1b is a schematic diagram of a structure of an electronic device in an opened state according to an embodiment of this application.

In addition, refer to FIG. 1*b*. FIG. 1*b* is a schematic diagram of a structure of an electronic device in an opened state. It should be noted that, in embodiments shown in FIG. 1*b* and FIG. 1*a*, structures of a same side of the electronic device are shown. It can be learned from FIG. 1*b* that the first surface 2*a* of the first housing 2 and the first surface 3*a* of the second housing 3 may be used as an appearance surface of the electronic device.

Figure 2A:
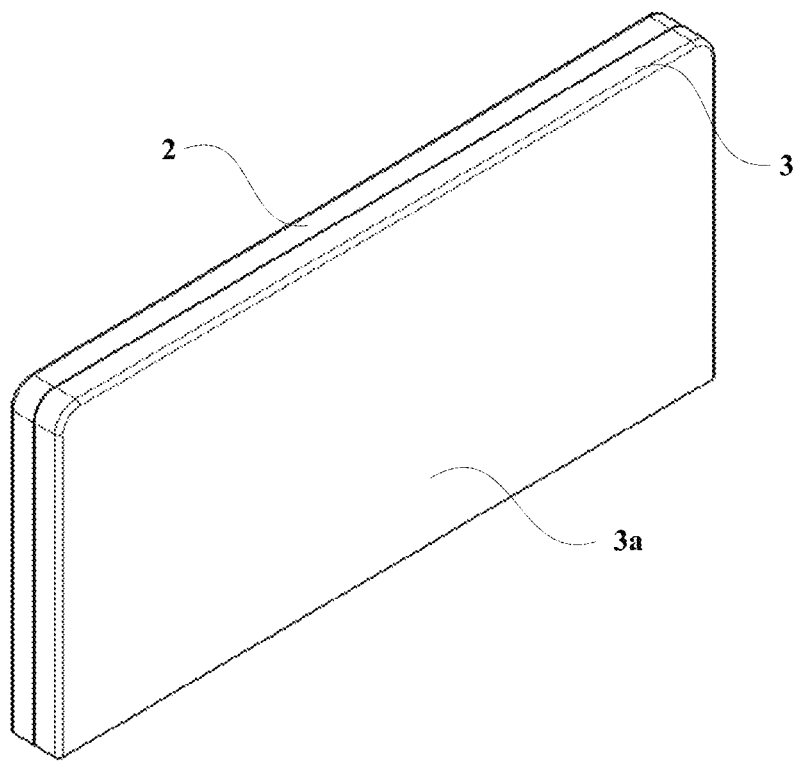
FIG. 2a is a schematic diagram of a structure of an electronic device in a closed state according to another embodiment of this application.
Figure 2B:
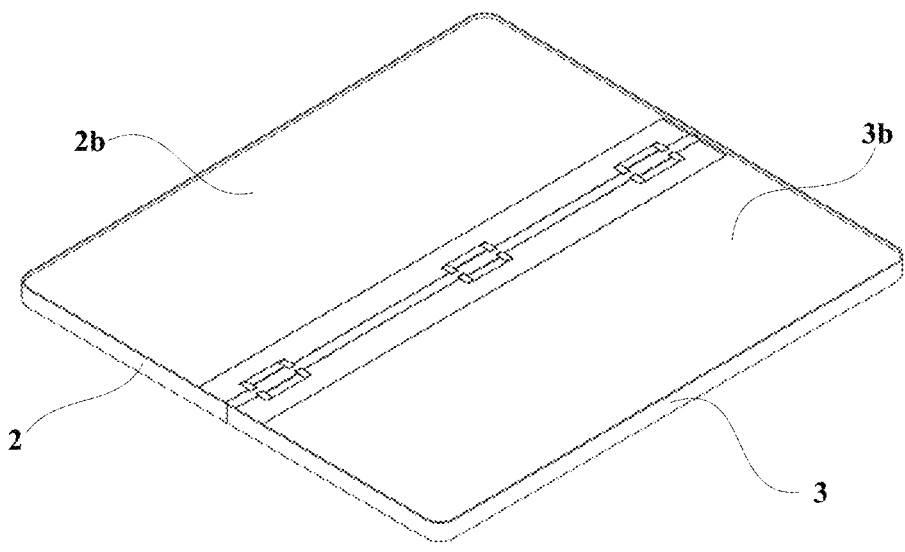
FIG. 2b is a schematic diagram of a structure of an electronic device in an opened state according to another embodiment of this application.

FIG. 2*a* is a schematic diagram of a structure of an electronic device in a closed state according to another embodiment of this application. FIG. 2*a* shows a structure of an opening end of the electronic device. When the electronic device is in the closed state, the opening end is an end that is of the electronic device and that is opposite to the rotating shaft mechanism 1. In addition, refer to FIG. 2*b*. FIG. 2*b* is a schematic diagram of a structure of an electronic device in an opened state. FIG. 2*b* shows a structure of a side on which a second surface 2*b* of a first housing 2 and a second surface 3*b* of a second housing 3 are located. The second surface 2*b* of the first housing 2 is a surface that is of the first housing 2 and that is configured to support a flexible display, and the second surface 3*b* of the second housing 3 is a surface that is of the second housing 3 and that is configured to support the flexible display. The flexible display may cover the second surface 2*b* of the first housing 2 and the second surface 3*b* of the second housing 3, and the flexible display may be fixedly connected to the second surface 2*b* of the first housing 2 and the second surface 3*b* of the second housing 3. A connection manner thereof may be but is not limited to bonding. In this way, when the electronic device is in the opened state, the first housing 2 and the second housing 3 may support the flexible display. In a process in which the first housing 2 and the second housing 3 rotate relative to each other from the opened state to the closed state or from the closed state to the opened state, the flexible display may be folded accordingly.

It may be understood that, in a process in which the electronic device changes from the closed state to the opened state or from the opened state to the closed state, the first housing 2 and the second housing 3 may rotate around the rotating shaft mechanism 1, to drive the flexible display to change from a folded state to an unfolded state or from an unfolded state to a folded state. When the electronic device is in the closed state, if space formed among the first housing 2, the rotating shaft mechanism 1, and the second housing 3 cannot meet a folding requirement of the flexible display, or when the electronic device is in the opened state, an extended length of a support surface provided by the first housing 2, the rotating shaft mechanism 1, and the second housing 3 does not match an unfolding length of the flexible display, the flexible display may be squeezed or pulled. After the electronic device is folded for a plurality of times, the flexible display is likely to be damaged.

The rotating shaft mechanism 1 provided in this application is intended to resolve the foregoing problem. A length maintaining mechanism is disposed, so that display accommodation space formed by the first housing 2, the second housing 3, and the rotating shaft mechanism 1 meets a folding requirement of the flexible display in a process in which the first housing 2 and the second housing 3 rotate relative to each other, and the extended length of the support surface formed by the first housing 2, the second housing 3, and the rotating shaft mechanism 1 in the opened state can match the unfolding length of the flexible display. This can avoid deformation of the flexible display, reduce squeezing or pulling stress on the flexible display, prolong a service life of the flexible display, and improve reliability of the electronic device. For ease of understanding the rotating shaft mechanism 1 provided in embodiments of this application, the following describes a structure of the rotating shaft mechanism 1 in detail with reference to the accompanying drawings and specific embodiments.

It should be noted that, terms used in the following embodiments are merely intended to describe specific embodiments, but are not intended to limit this application. The terms "one", "a", "the", "the foregoing", "this", and "the one" of singular forms used in this specification and the appended claims of this application are also intended to include forms such as "one or more", unless otherwise specified in the context clearly.

Reference to "an embodiment", "some embodiments", or the like described in this specification indicates that one or more embodiments of this application include a specific feature, structure, or characteristic described with reference to the embodiments. Therefore, expressions such as "in an embodiment", "in some embodiments", "in some other embodiments", and "in other embodiments" that appear at different places in this specification do not necessarily mean reference to a same embodiment. Instead, the expressions mean "one or more but not all of embodiments", unless otherwise specifically emphasized in another manner. The terms "include", "comprise", "have", and their variants all mean "include but are not limited to", unless otherwise specifically emphasized in another manner.

Figure 3:
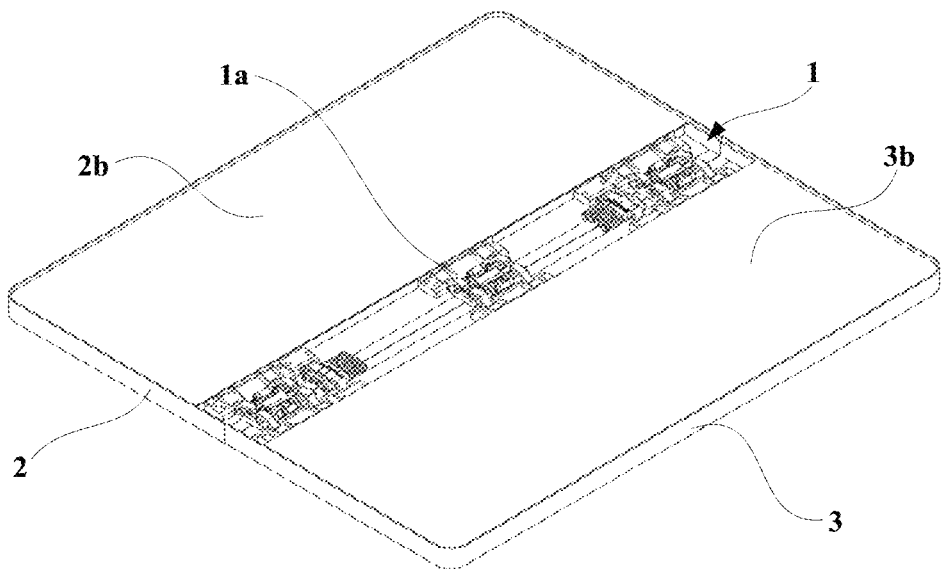
FIG. 3 is a schematic diagram of a partial structure of an electronic device according to an embodiment of this application.

FIG. 3 is a schematic diagram of a partial structure of the electronic device provided in FIG. 2b. It can be learned from FIG. 3 that the first housing 2 and the second housing 3 are located on two opposite sides of the rotating shaft mechanism 1. In this application, the rotating shaft mechanism 1 may include a length maintaining mechanism 1a, there may be a plurality of length maintaining mechanisms 1a, and the plurality of length maintaining mechanisms 1a may be disposed at intervals in a length direction of the rotating shaft mechanism 1. The first housing 2 and the second housing 3 may be rotatably connected by using the plurality of length maintaining mechanisms 1a. The plurality of length maintaining mechanisms 1a are disposed at intervals, so that rotation stability of the rotating shaft mechanism 1 can be effectively improved, and relative-rotation stability of the first housing 2 and the second housing 3 of the electronic device can be improved.

Figure 4:
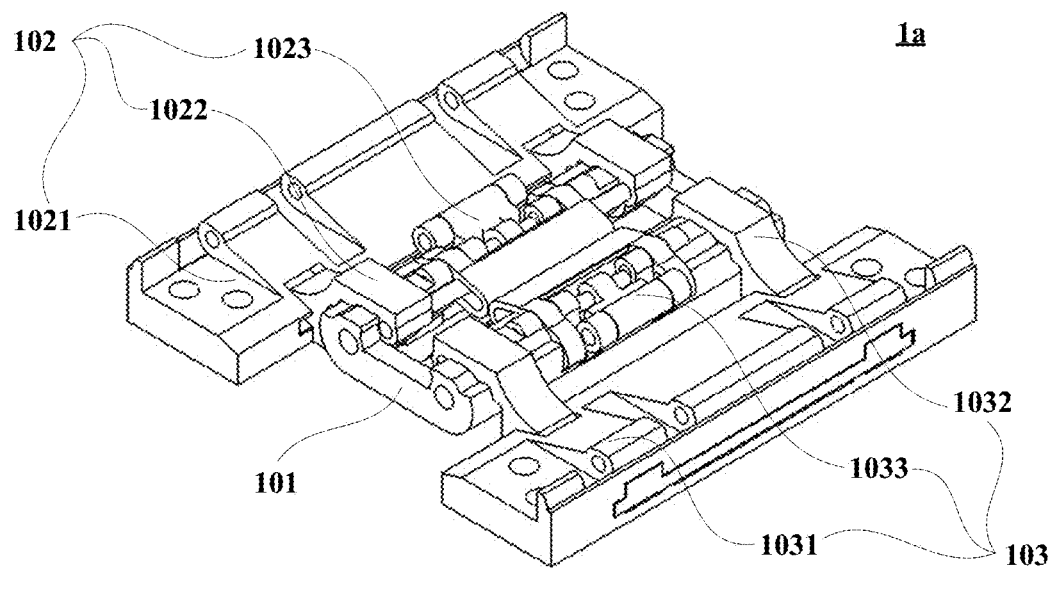
FIG. 4 is a schematic diagram of a structure of a length maintaining mechanism according to an embodiment of this application.

For an example disposition of the length maintaining mechanism 1a, refer to FIG. 4. FIG. 4 is a schematic diagram of a structure of the length maintaining mechanism 1a according to an embodiment of this application. In this embodiment, the length maintaining mechanism 1a may include a fastening member 101 and two swing arms. For ease of description, in this application, the two swing arms may be respectively denoted as a first swing arm 102 and a second swing arm 103. The first swing arm 102 and the second swing arm 103 are respectively disposed on two sides of the fastening member 101, and are rotatably connected to the fastening member 101. In addition, the first swing arm 102 may be fixedly connected to the first housing 2, and the second swing arm 103 may be fixedly connected to the second housing 3. In this case, in a process in which the first housing 2 and the second housing 3 rotate relative to each other, the first swing arm 102 and the second swing arm 103 may be driven to rotate around the fastening member 101.

Figure 5:
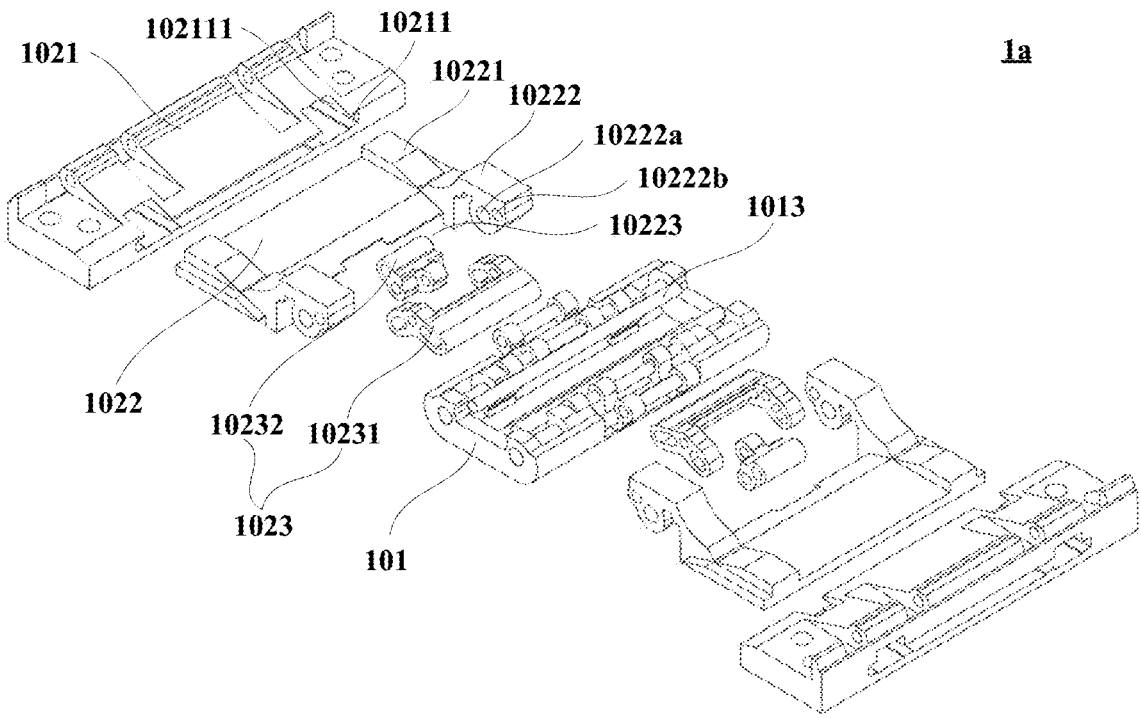
FIG. 5 is an exploded view of a length maintaining mechanism according to an embodiment of this application.

FIG. 5 is an exploded view of the length maintaining mechanism 1a shown in FIG. 4. In this embodiment, the first swing arm 102 includes a sliding block 1021, a swing rod 1022, and a connecting assembly 1023. The sliding block 1021 may be fixedly connected to the first housing 2 shown in FIG. 3, and a connection manner thereof may be but is not limited to a fixed connection by using a fastener such as a screw. In addition, the sliding block 1021 is provided with a sliding slot 10211, and the sliding slot 10211 may be, for example, a cavity structure formed in the sliding block 1021.

The swing rod 1022 is accommodated in the sliding slot 10211, and may slide in the sliding slot 10211 of the sliding block 1021 in a direction toward or away from the fastening member 101. In this application, the swing rod 1022 may be provided with a protrusion 10221, and there may be one or more protrusions 10221. For example, in the embodiment shown in FIG. 5, the swing rod 1022 is provided with two protrusions 10221. In addition, the sliding slot 10211 may be provided with a sliding rail 102111, and a quantity of sliding rails 102111 is not less than a quantity of protrusions 10221, so that each protrusion 10221 can be accommodated in one sliding rail 102111, and can slide in the sliding rail 102111 in a direction toward or away from the fastening member 101. It may be understood that, in some other embodiments of this application, alternatively, the sliding rail 102111 may be disposed on the swing rod 1022, and the protrusion 10221 may be disposed in the sliding slot 10211. Sliding cooperation between the protrusion 10221 and the sliding rail 102111 can provide a guiding function for sliding of the swing rod 1022 in the sliding slot 10211, and improve stability of the sliding of the swing rod 1022 in the sliding slot 10211. This helps improve movement stability of the entire rotating shaft mechanism 1, and improve rotation stability of the electronic device that uses the rotating shaft mechanism 1.

Figure 6:
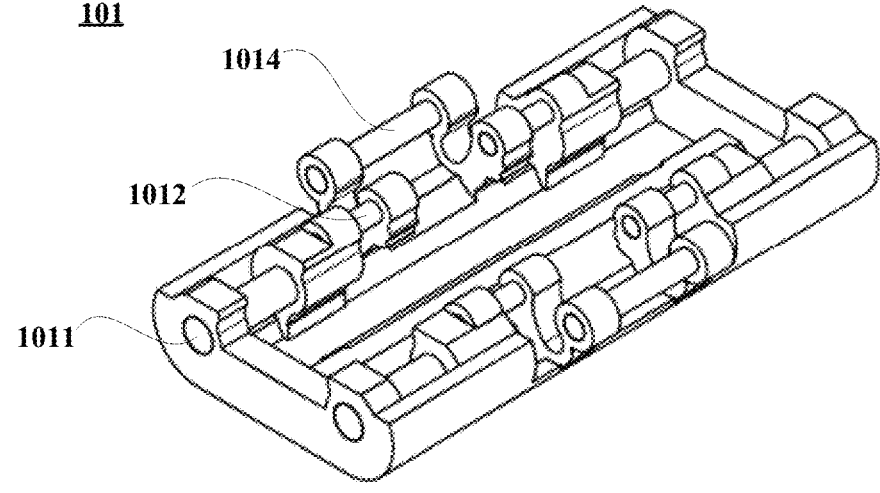
FIG. 6 is a schematic diagram of a structure of a fastening member according to an embodiment of this application.

Still refer to FIG. 5. An end that is of the swing rod 1022 and that is away from the sliding block 1021 may be rotatably connected to the fastening member 101. For example, the end that is of the swing rod 1022 and that is away from the sliding block 1021 may be provided with a rotating portion 10222, the rotating portion 10222 is provided with a first mounting hole 10222a, and the first mounting hole 10222a may be a round hole. In addition, refer to both FIG. 5 and FIG. 6. FIG. 6 is a schematic diagram of a structure of the fastening member 101 in FIG. 5. The fastening member 101 is provided with a first rotating shaft 1011, an axial direction of the first rotating shaft 1011 may be the same as the length direction of the rotating shaft mechanism 1, and the first rotating shaft 1011 may pass through the first mounting hole 10222a, so that the rotating portion 10222 is rotatably connected to the first rotating shaft 1011.

Still refer to FIG. 5 and FIG. 6. In this application, the swing rod 1022 may be provided with two rotating portions 10222, and the two rotating portions 10222 are disposed at an interval in the length direction of the rotating shaft mechanism 1, to form first mounting space 10223 between the two rotating portions 10222. The swing rod 1022 is rotatably connected to the fastening member 101 by using the two rotating portions 10222. This can help improve stability of rotation of the swing rod 1022 around the fastening member 101.

Still refer to FIG. 5. In this embodiment of this application, at least a part of the connecting assembly 1023 may be accommodated in the first mounting space 10223 between the two rotating portions 10222 of the swing rod 1022. In this way, a structure of the rotating shaft mechanism 1 can be compact. The connecting assembly 1023 may include a first connecting member 10231 and a second connecting member 10232.

Figure 7:
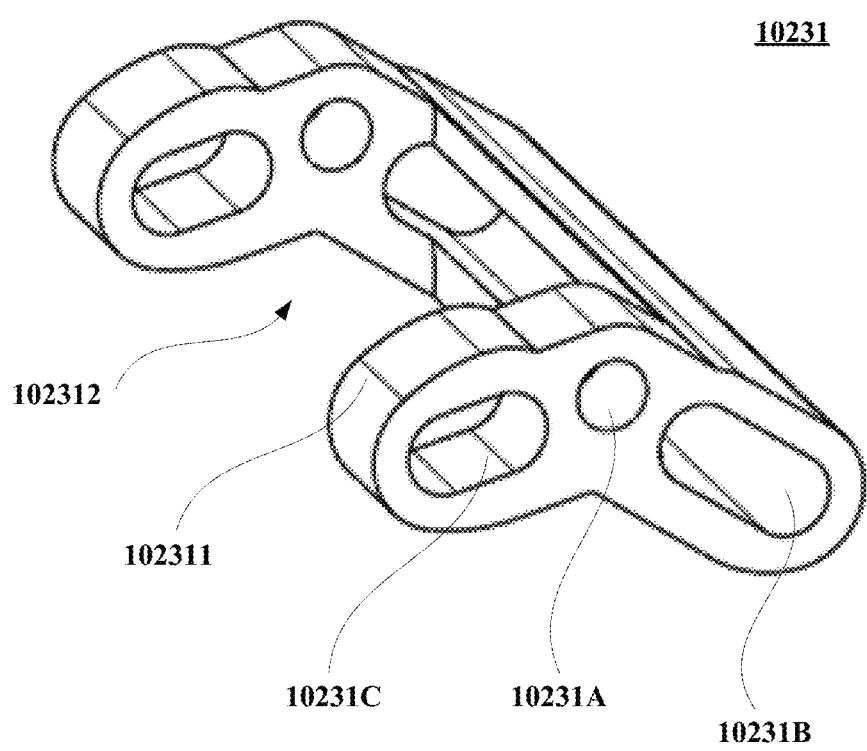
FIG. 7 is a schematic diagram of a structure of a first connecting member according to an embodiment of this application.

FIG. 7 is a schematic diagram of a structure of the first connecting member 10231 according to an embodiment of this application. In this embodiment, the first connecting member 10231 is provided with a first mounting hole 10231A, and the first mounting hole 10231A may be a round hole. Refer to both FIG. 6 and FIG. 7. The fastening member 101 is further provided with a second rotating shaft 1012, and the second rotating shaft 1012 passes through the first mounting hole 10231A, so that the first connecting member 10231 is rotatably connected to the second rotating shaft 1012.

Still refer to FIG. 7. An end part that is of the first connecting member 10231 and that is away from the fastening member 101 may be provided with a connecting portion 102311, and the first mounting hole 10231A may be provided on the connecting portion 102311. In addition, in this application, the first connecting member 10231 may be provided with two connecting portions 102311, and the two connecting portions 102311 are disposed at an interval in the length direction of the rotating shaft mechanism 1, to form second mounting space 102312 between the two connecting portions 102311. The first connecting member 10231 is rotatably connected to the fastening member 101 by using the two connecting portions 102311. This can effectively improve stability of rotation of the first connecting member 10231 around the fastening member 101.

An end part that is of the first connecting member 10231 and that faces the fastening member 101 is provided with a second mounting hole 10231B, the second mounting hole 10231B is a long hole, and the second mounting hole 10231B is a through hole provided in the length direction of the rotating shaft mechanism 1. The connecting portion 102311 of the first connecting member 10231 is further provided with a third mounting hole 10231C, and the third mounting hole 10231C is a long hole. In addition, in a same end surface of the first connecting member 10231, the first mounting hole 10231A is located between the second mounting hole 10231B and the third mounting hole 10231C. In this case, the second rotating shaft 1012 is located between the second mounting hole 10231B and the second mounting hole 10231C, and a long axis direction of the second mounting hole 10231B may intersect with a long axis direction of the third mounting hole 10231C.

Still refer to FIG. 5. The swing rod 1022 is further provided with a second mounting hole 10222b, and the second mounting hole 10222b is located on a side that is of the first mounting hole 10222a and that faces the fastening member 101. In addition, the second mounting hole 10222b of the swing rod 1022 is connected to the second mounting hole 10231B of the first connecting member 10231 by using a third rotating shaft 1013, and the third rotating shaft 1013 may be but is not limited to a pin or the like. It can be learned from descriptions of the foregoing embodiments that the second mounting hole 10231B of the first connecting member 10231 may be located between the two rotating portions 10222 of the swing rod 1022. In this case, the third rotating shaft 1013 may pass through second mounting holes 10222b on the two rotating portions 10222 of the swing rod 1022 and the second mounting hole 10231B of the first connecting member 10231. In this application, the third rotating shaft 1013 may be rotatably connected to the two rotating portions 10222 of the swing rod 1022. This is not limited herein. In this way, in a process in which the swing rod 1022 rotates around the first rotating shaft 1011 of the fastening member 101, the third rotating shaft 1013 may slide along the second mounting hole 10231B of the first connecting member 10231, so that the first connecting member 10231 is driven to rotate around the second rotating shaft 1012. It may be understood that, in this application, a rotation track of the first connecting member 10231 can be adjusted by adjusting the long axis direction of the second mounting hole 10231B.

Figure 8:
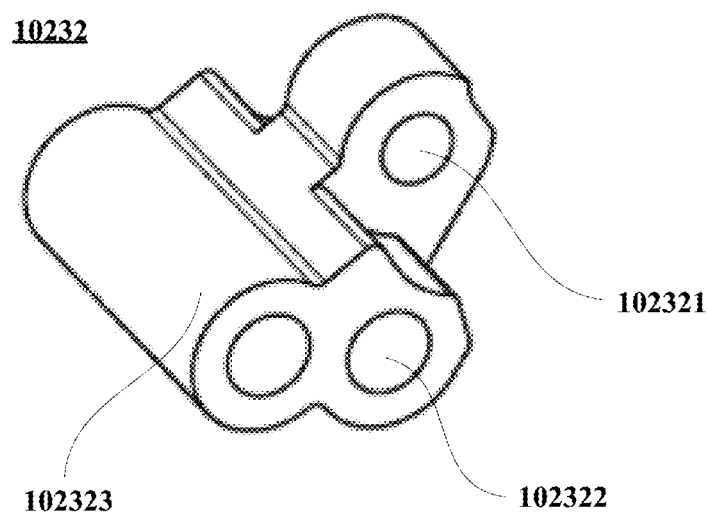
FIG. 8 is a schematic diagram of a structure of a second connecting member according to an embodiment of this application.

As shown in FIG. 5, at least a part of the second connecting member 10232 may be located in the second mounting space 102312 of the first connecting member 10231. In this case, the second connecting member 10232 is located between the first connecting member 10231 and the swing rod 1022. FIG. 8 is a schematic diagram of a structure of the second connecting member 10232 according to an embodiment of this application. Refer to both FIG. 5 and FIG. 8. A side that is of the second connecting member 10232 and that faces the fastening member 101 is provided with a first mounting hole 102321, and the first mounting hole 102321 may be a round hole. In addition, refer to FIG. 6. The fastening member 101 is further provided with a fourth rotating shaft 1014, and the fourth rotating shaft 1014 passes through the first mounting hole 102321, so that the first mounting hole 102321 of the second connecting member 10232 is rotatably connected to the fastening member 101 by using the fourth rotating shaft 1014. Refer to both FIG. 5 and FIG. 6. In this application, the fourth rotating shaft 1014 is located, relative to the second rotating shaft 1012, on a side that is of the fastening member 101 and that faces the second connecting member 10232.

Still refer to FIG. 5 and FIG. 8. The second connecting member 10232 further includes a second mounting hole 102322 and a third mounting hole 102323. Both the second mounting hole 102322 and the third mounting hole 102323 may be round holes, the second mounting hole 102322 is located between the first mounting hole 102321 and the third mounting hole 102323, and axes of the first mounting hole 102321, the second mounting hole 102322, and the third mounting hole 102323 may be parallel to each other. In addition, in this application, the second mounting hole 102322 of the second connecting member 10232 may be rotatably connected to the third mounting hole 10231C of the first connecting member 10231 by using a fifth rotating shaft.

Still refer to FIG. 4 and FIG. 5. In this application, the second swing arm 103 and the first swing arm 102 may be symmetrically disposed relative to the fastening member 101. The second swing arm 103 may include a sliding block 1031, a swing rod 1032, and a connecting assembly 1033. The sliding block 1031 may be fastened to the second housing 3 of the electronic device in the embodiment shown in FIG. 3. For an example disposition manners, relative positions, and connection relationships of the sliding block 1031, the swing rod 1032, and the connecting assembly 1033, and connection relationships between them and the fastening member 101, refer to the first swing arm 102. Details are not described herein again.

Figure 9:
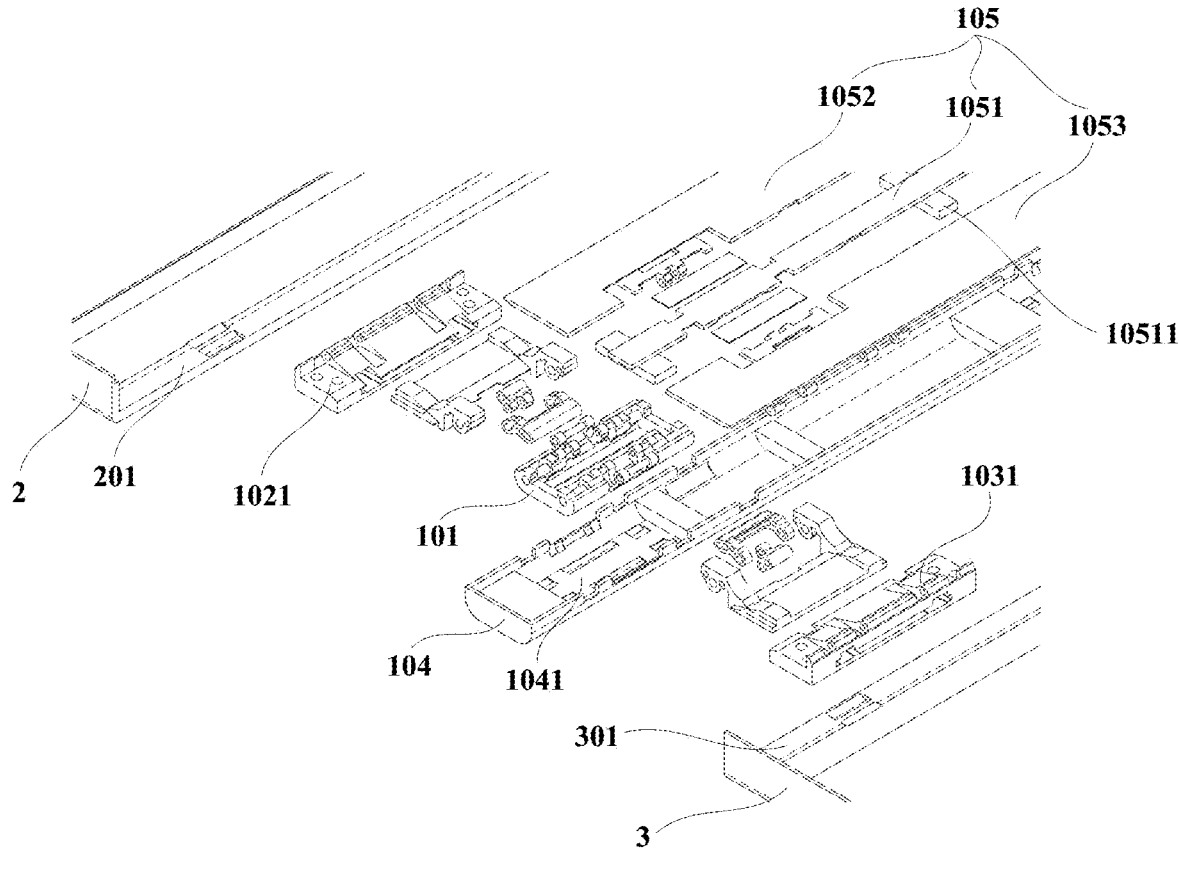
FIG. 9 is an exploded view of a partial structure of an electronic device according to an embodiment of this application.

In this application, to prevent the length maintaining mechanism 1a from being exposed, the rotating shaft mechanism 1 may further include a main shaft assembly 1b. FIG. 9 is an exploded view of a partial structure of an electronic device according to this application. It can be learned from FIG. 9 that the main shaft assembly 1b may include a cover plate 105. The cover plate 105 may include two support plates. For ease of description, in this application, the two support plates are respectively denoted as a first support plate 1052 and a second support plate 1053. In addition, the cover plate 105 may further include a main shaft fastening plate 1051, and a length direction of the main shaft fastening plate 1051 is the same as the length direction of the rotating shaft mechanism 1. The first support plate 1052 and the second support plate 1053 may be located on two sides of the main shaft fastening plate 1051, and length directions of the first support plate 1052 and the second support plate 1053 are the same as the length direction of the main shaft fastening plate 1051.

In addition, support portions 10511 are separately disposed on two sides that are of the main shaft fastening plate 1051 and that face the first support plate 1052 and the second support plate 1053. There may be a plurality of support portions 10511 located on a same side of the main shaft fastening plate 1051, and the plurality of support portions 10511 may be disposed at intervals in the length direction of the main shaft fastening plate 1051. Sides that are of the first support plate 1052 and the second support plate 1053 and that face the main shaft fastening plate 1051 may be separately disposed on surfaces that are of corresponding support portions 10511 and that are away from a housing 104, and may slide along the surfaces that are of the corresponding support portions 10511 and that are away from the housing 104.

Still refer to FIG. 9. In this application, the main shaft assembly 1b may further include the housing 104, and the housing 104 may be used as an appearance member of the rotating shaft mechanism 1, to improve aesthetics of the rotating shaft mechanism 1. The housing 104 is provided with an accommodating groove 1041. The length maintaining mechanism 1a shown in FIG. 4 is accommodated in the accommodating groove 1041, and may be fastened to the housing 104. The length maintaining mechanism 1a may be fastened to the housing 104 by fastening the fastening member 101 to the housing 104. The fastening member 101 may be fixedly connected to the housing 104 by using a fastener such as a screw. This is not limited herein. In addition, the main shaft fastening plate 1051 is fastened to the housing 104. The length maintaining mechanism 1a may be located between the main shaft fastening plate 1051 and the housing 104, and the main shaft fastening plate 1051 is fixedly connected to the housing 104, so that the length maintaining mechanism 1a can be squeezed in the housing 104, to reduce shaking of the fastening member 101. It may be understood that, when the rotating shaft mechanism 1 is used in the electronic device, the cover plate 105 may be configured to support a flexible display 4.

Still refer to FIG. 9. In this application, the first support plate 1052 may cover the first swing arm 102, and an end that is of the first support plate 1052 and that faces the fastening member 101 is rotatably connected to the third mounting hole 102323 of the second connecting member 10232 shown in FIG. 8 by using a sixth rotating shaft (not shown in FIG. 9). In addition, an end that is of the first support plate 1052 and that is away from the fastening member 101 is rotatably connected to an end that is of the sliding block 1021 and that is away from the fastening member 101 by using a seventh rotating shaft (not shown in FIG. 9).

Similarly, the second support plate 1053 may cover the second swing arm 103, and an end that is of the second support plate 1053 and that faces the fastening member 101 is rotatably connected to the connecting assembly 1033 of the second swing arm 103. In addition, an end that is of the second support plate 1053 and that is away from the fastening member 101 is rotatably connected to an end that is of the sliding block 1031 of the second swing arm 103 and that is away from the fastening member 101.

It is learned from descriptions of the foregoing embodiments that the sliding block 1021 may be fastened to the first housing 2 of the electronic device, and the sliding block 1031 may be fastened to the second housing 3 of the electronic device. Still refer to FIG. 9. In embodiments of this application, a side that is of the first housing 2 and that faces the second housing 3 is provided with a first opening groove 201, and a side that is of the second housing 3 and that faces the first housing 2 is provided with a second opening groove 301. In this case, the sliding block 1021 may be located in the first opening groove 201, and is fixedly connected to a groove wall of the first opening groove 201. The sliding block 1031 may be located in the second opening groove 301, and is fixedly connected to a groove wall of the second opening groove 301.

In addition, refer to both FIG. 3 and FIG. 9. When the electronic device is in an opened state, the first opening groove 201 and the second opening groove 301 are provided to be aligned and combined with each other, to form an accommodating portion between the first housing 2 and the second housing 3. It can be learned from FIG. 3 that, when the electronic device is in the opened state, the entire rotating shaft mechanism 1 may be hidden in the accommodating portion. In addition, refer to both FIG. 1b and FIG. 3. The first surface 2a of the first housing 2 and the first surface 3a of the second housing 3 of the electronic device may be connected to each other, so that the electronic device can have a flat appearance surface with a relatively small gap, to improve an integrated embodiment of an appearance of the electronic device and improve appearance aesthetics of the electronic device.

For ease of understanding linkage relationships between various mechanisms when the rotating shaft mechanism 1 provided in this application is used in the electronic device, the following describes, with reference to the accompanying drawings, states of the mechanisms when the electronic device is in a closed state and an opened state. It should be noted that, in this application, structures of the first swing arm 102 and the second swing arm 103 may be the same, and a connection relationship between the first swing arm 102 and the fastening member 101 may be the same as a connection relationship between the second swing arm 103 and the fastening member 101. For brevity of description, in the following embodiments of this application, the first swing arm 102 is mainly described in some embodiments, and the second swing arm 103 may be disposed with reference to the first swing arm 102. Details are not described herein again.

Figure 10A:
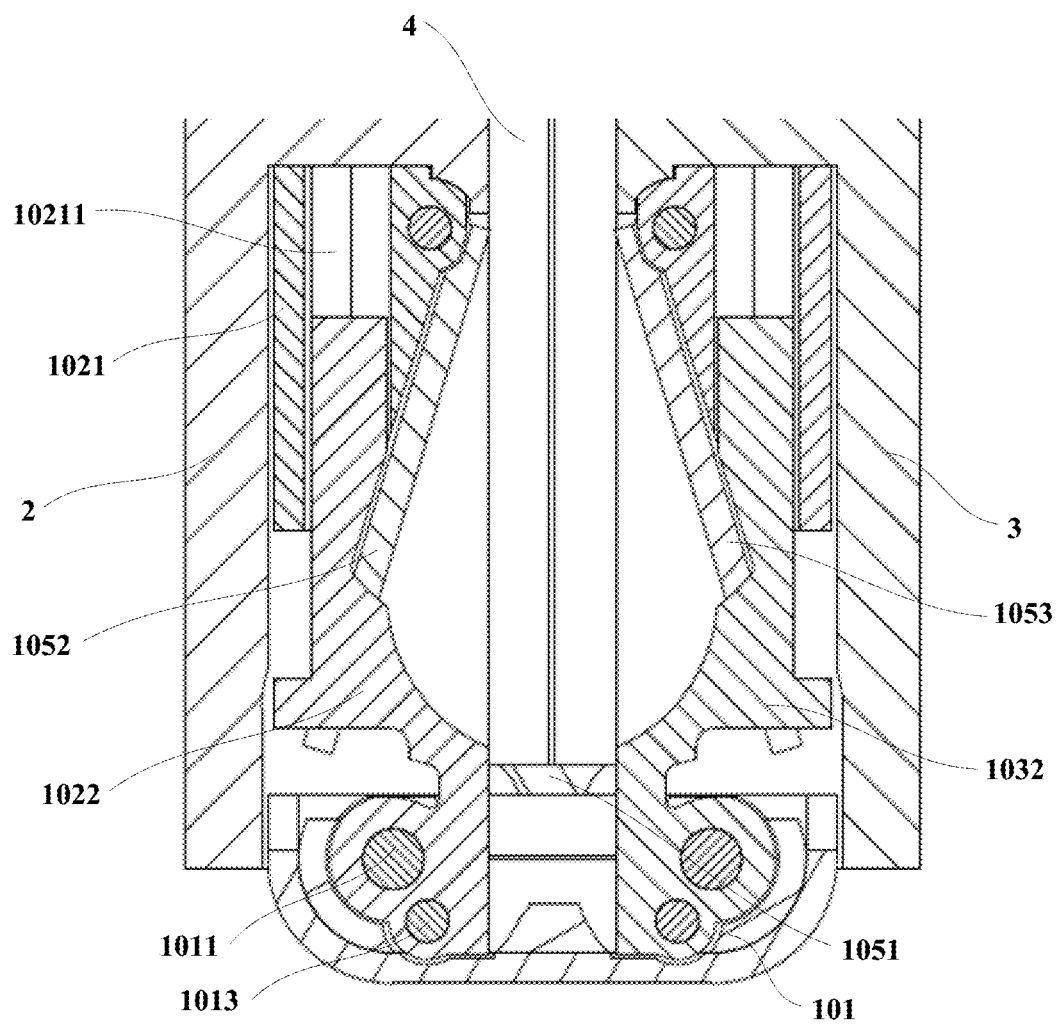
FIG. 10a is a sectional view of an electronic device in a closed state according to an embodiment of this application.

First, refer to FIG. 10a. FIG. 10a is a sectional view of an electronic device according to an embodiment of this application. FIG. 10a is a sectional view at the swing rod 1022 of the electronic device in a closed state. In this embodiment, an end that is of the first support plate 1052 and that is configured to be connected to the second connecting member 10232 is located, relative to an end that is of the first support plate 1052 and that is configured to be connected to the sliding block 1021, on a side that is of the main shaft fastening plate 1051 and that faces the first housing 2, so that the first support plate 1052 is tilted toward a side that is away from the main shaft fastening plate 1051. Similarly, the second support plate 1053 is also tilted toward a side that is away from the main shaft fastening plate 1051. Still refer to FIG. 10*a*. Ends that are of the first support plate 1052 and the second support plate 1053 and that are configured to be connected to corresponding connecting members are disposed away from each other, and ends that are of the first support plate 1052 and the second support plate 1053 and that are configured to be connected to corresponding sliding blocks are disposed close to each other, to form display accommodation space between the first support plate 1052 and the second support plate 1053. A folded part of the flexible display 4 may be accommodated in the display accommodation space.

Figure 10B:
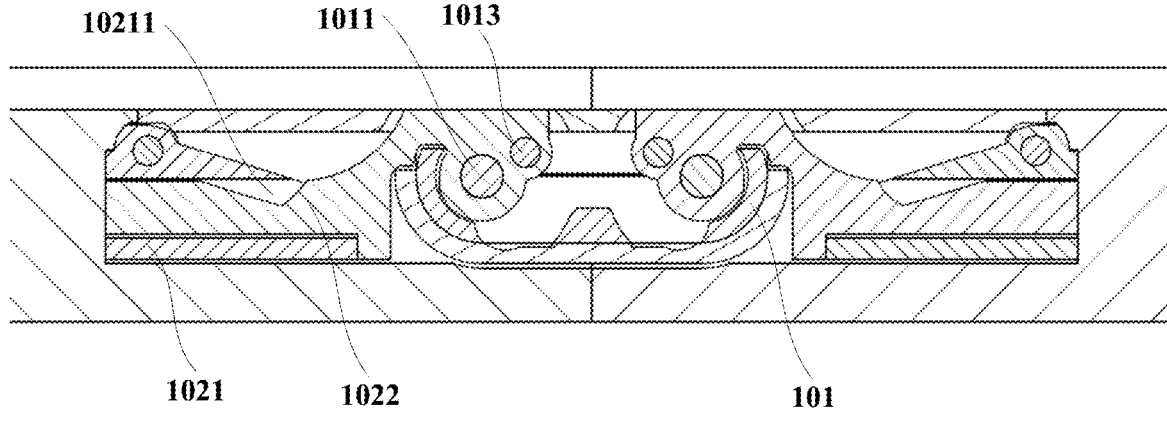
FIG. 10b is a sectional view of the electronic device shown in FIG. 10a in an opened state.

FIG. 10*b* is a sectional view of the electronic device shown in FIG. 10*a* in an opened state. It can be learned from comparison between FIG. 10*a* and FIG. 10*b* that, in a process from the closed state shown in FIG. 10*a* to the opened state shown in FIG. 10*b*, the swing rod 1022 may rotate around the first rotating shaft 1011, and a position of the swing rod 1022 in the sliding slot 10211 of the sliding block 1021 changes simultaneously. In this case, the sliding block 1021 slides relative to the swing rod 1022 in a direction toward the fastening member 101. Therefore, a distance between the sliding block 1021 and the fastening member 101 is adjusted through sliding, so that a distance between the first support plate 1052 and the fastening member 101 is adjusted. In this way, the display accommodation space formed between the first support plate 1052 and the second support plate 1053 can be adjusted by properly designing a sliding distance, so that the display accommodation space meets a folding requirement of the flexible display 4. Therefore, the flexible display 4 can be prevented from being squeezed or pulled in a folding process of the electronic device, to prolong a service life of the flexible display 4.

Figure 11A:
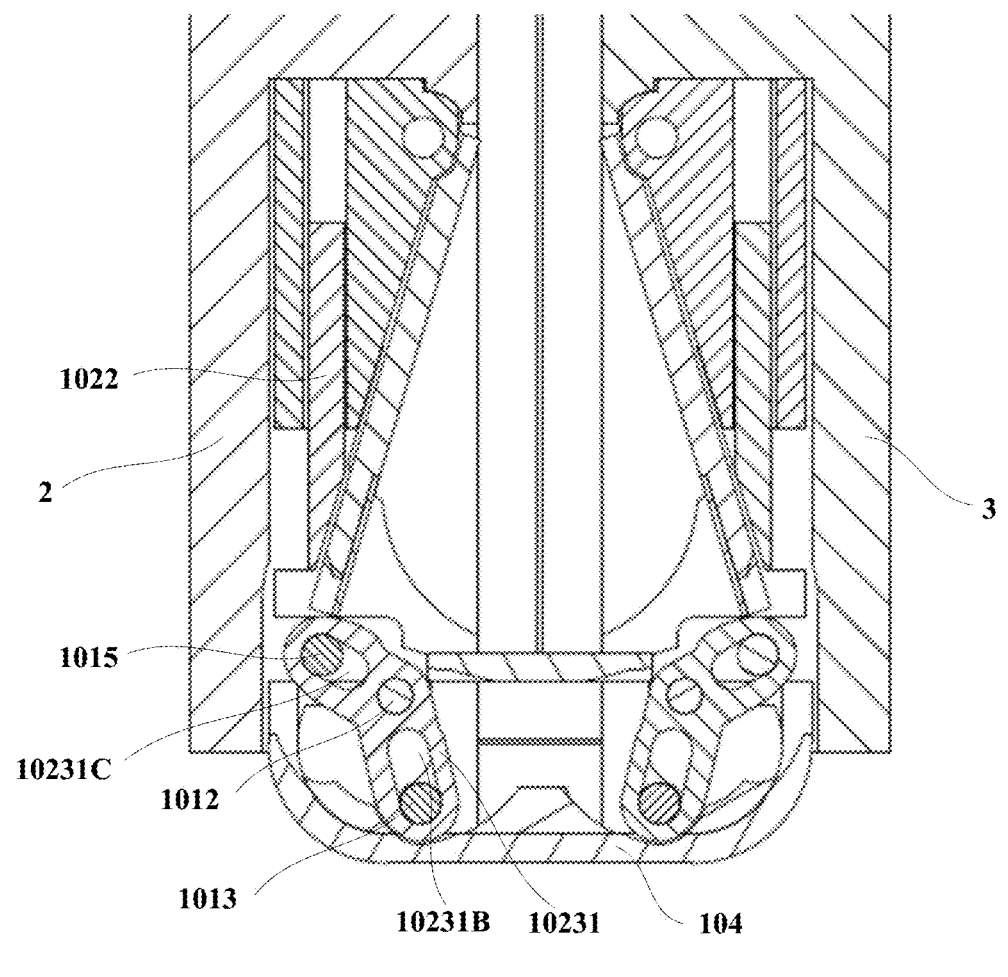
FIG. 11a is a sectional view of an electronic device in a closed state according to another embodiment of this application.

Next, refer to FIG. 11*a*. FIG. 11*a* is a sectional view of an electronic device according to another embodiment of this application. FIG. 11*a* is a sectional view at the first connecting member 10231 of the electronic device in a closed state. In this state, the third rotating shaft 1013 is located on a side that is of the second mounting hole 10231B of the first connecting member 10231 and that is close to the housing 104 of the main shaft assembly 1*b*, and the third mounting hole 10231C is located, relative to the second mounting hole 10231B, on a side that is away from the housing 104 of the main shaft assembly.

Figure 11B:
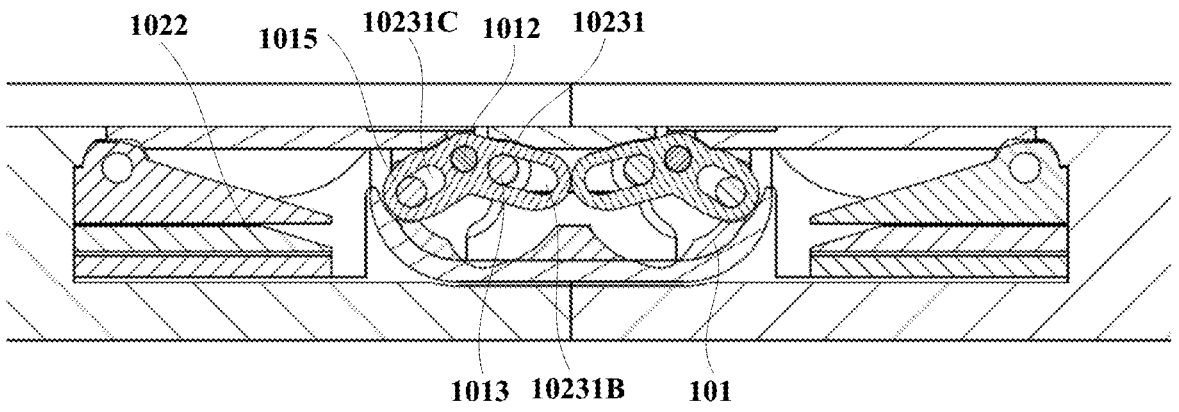
FIG. 11b is a sectional view of the electronic device shown in FIG. 11a in an opened state.

FIG. 11*b* is a sectional view of the electronic device shown in FIG. 11*a* in an opened state. It can be learned from descriptions of the foregoing embodiments that the swing rod 1022 is rotatably connected to the first connecting member 10231 by using the third rotating shaft 1013. In this case, in a process from the closed state shown in FIG. 11*a* to the opened state shown in FIG. 11*b*, rotation of the swing rod 1022 makes the third rotating shaft 1013 slide in the second mounting hole 10231B of the first connecting member 10231, so that the first connecting member 10231 is driven to rotate around the second rotating shaft 1012. In addition, it can be learned from comparison between FIG. 11*a* and FIG. 11*b* that, in this process, the first connecting member 10231 may rotate in a counterclockwise direction. It may be understood that, because the first swing arm 102 and the second swing arm 103 may be symmetrically disposed relative to the fastening member 101, in the foregoing process, a component that is of the second swing arm 103 and that is disposed to correspond to the first connecting member 10231 may rotate in a clockwise direction.

Figure 12A:
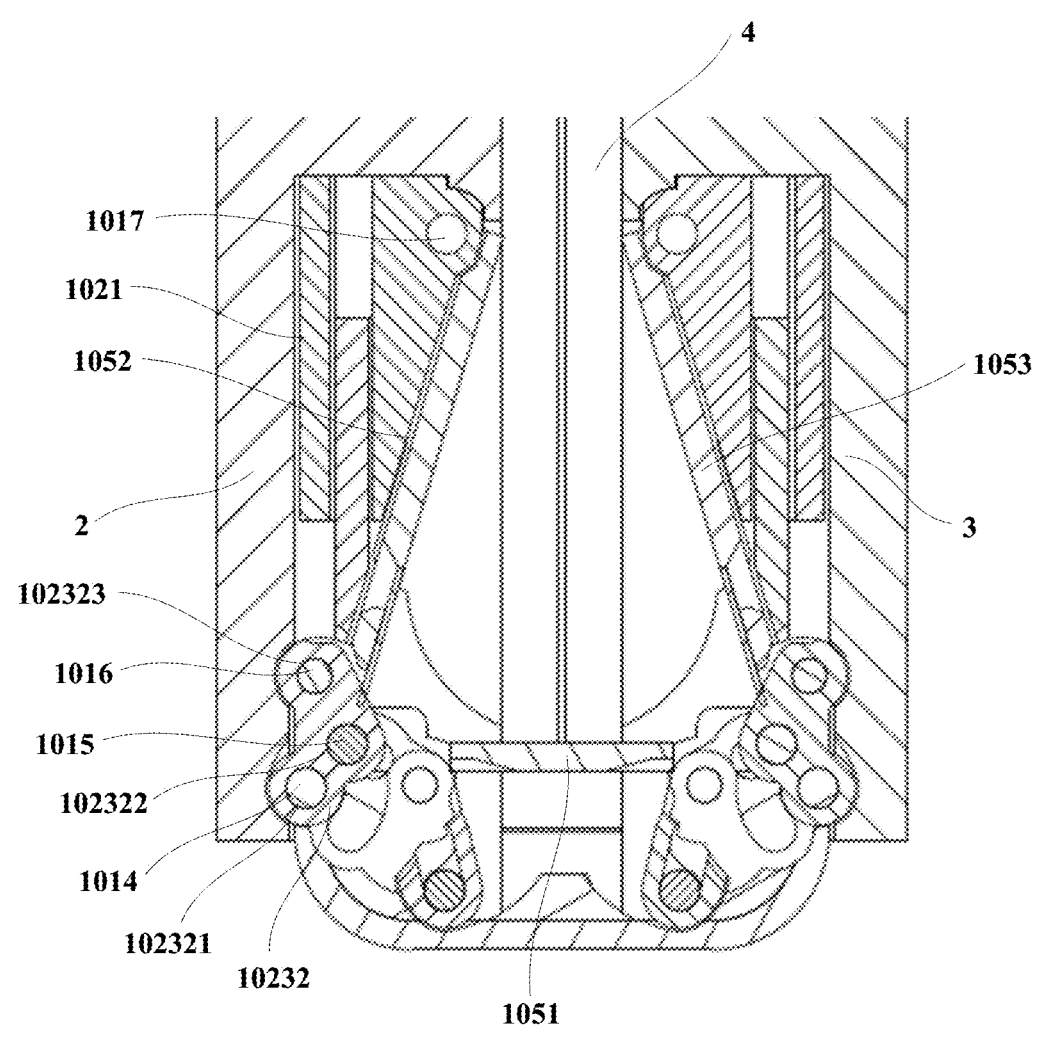
FIG. 12a is a sectional view of an electronic device in a closed state according to another embodiment of this application.

Then, refer to FIG. 12*a*. FIG. 12*a* is a sectional view of an electronic device according to another embodiment of this application. FIG. 12*a* is a sectional view at the second connecting member 10232 of the electronic device in a closed state. It can be learned from descriptions of the foregoing embodiments that the third mounting hole 102323 of the second connecting member 10232 is rotatably connected to the first support plate 1052 by using the sixth rotating shaft 1016. As shown in FIG. 12*a*, in the closed state, the second mounting hole 102322 of the second connecting member 10232 is located, relative to the first mounting hole 102321, on a side that faces the main shaft fastening plate 1051, and the third mounting hole 102323 is located, relative to the second mounting hole 102322, on a side that faces the sliding block 1021. In this case, under an action of the second connecting member 10232, the first support plate 1052 is tilted toward a side that is away from the main shaft fastening plate 1051. Similarly, the second support plate 1053 is also tilted toward a side that is away from the main shaft fastening plate 1051. Still refer to FIG. 12*a*. Ends that are of the first support plate 1052 and the second support plate 1053 and that are configured to be connected to corresponding connecting members are disposed away from each other, and ends that are of the first support plate 1052 and the second support plate 1053 and that are configured to be connected to corresponding sliding blocks are disposed close to each other, to form display accommodation space between the first support plate 1052 and the second support plate 1053. A folded part of the flexible display 4 may be accommodated in the display accommodation space.

Figure 12B:
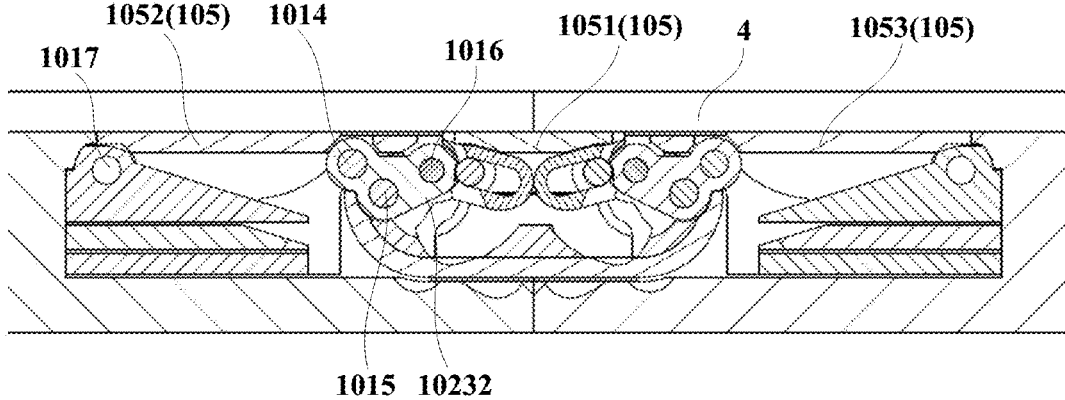
FIG. 12b is a sectional view of the electronic device shown in FIG. 12a in an opened state.

FIG. 12*b* is a sectional view of the electronic device shown in FIG. 12*a* in an opened state. It can be learned from descriptions of the foregoing embodiments that the second mounting hole 102322 of the second connecting member 10232 is rotatably connected to the third mounting hole 10231C of the first connecting member 10231 shown in FIG. 11*b* by using the fifth rotating shaft 1015. In a process from the closed state shown in FIG. 12*a* to the opened state shown in FIG. 12*b*, when the first connecting member 10231 rotates counterclockwise, the second connecting member 10232 is driven to rotate around the fourth rotating shaft 1014. In addition, it can be learned from comparison between FIG. 12*a* and FIG. 12*b* that, in this process, the second connecting member 10232 may rotate in a clockwise direction. It may be understood that, because the first swing arm 102 and the second swing arm may be symmetrically disposed relative to the fastening member 101, in the foregoing process, a component that is of the second swing arm and that is disposed to correspond to the second connecting member 10232 may rotate in a counterclockwise direction.

Still refer to FIG. 12*a* and FIG. 12*b*. In the process from the closed state shown in FIG. 12*a* to the opened state shown in FIG. 12*b*, the second connecting member 10232 drives the first support plate 1052 to move in a direction toward the main shaft fastening plate 1051. In addition, because an end that is of the first support plate 1052 and that is away from the main shaft fastening plate 1051 is rotatably connected to the sliding block 1021, and the sliding block 1021 is fixedly connected to the first housing 2, in a process in which the first support plate 1052 moves in the direction toward the main shaft fastening plate 1051, the sliding block 1021 may be driven to slide relative to the swing rod 1022, so that a distance between the first housing 2 and the fastening member 101 can be adjusted by adjusting a sliding distance.

It can be learned from FIG. 12*b* that, when the electronic device is in the opened state, the first support plate 1052, the second support plate 1053, and the main shaft fastening plate 1051 may be connected to form a flat surface. In this way, the first support plate 1052, the second support plate 1053, and the main shaft fastening plate 1051 can provide relatively full support for a part that is of the flexible display 4 and that covers the cover plate 105, to avoid collapse of the flexible display 4 at this position and reduce deformation of the flexible display 4. This helps improve structure reliability of the flexible display 4.

Figure 13A:
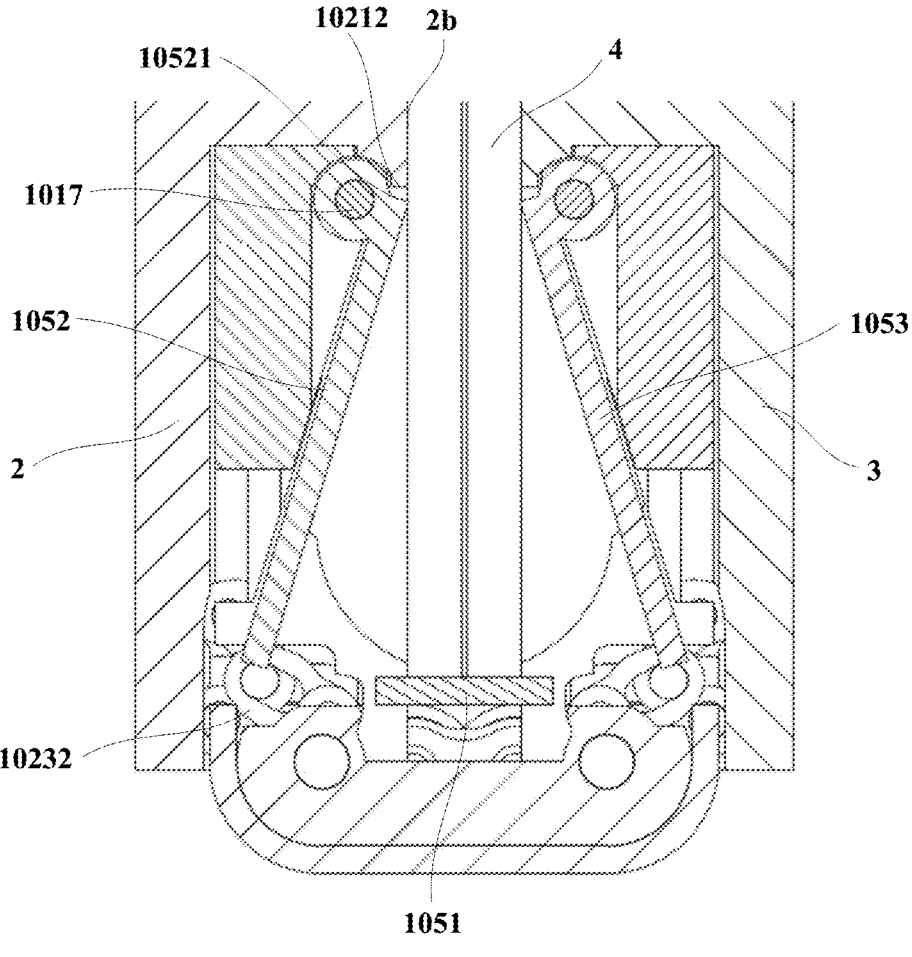
FIG. 13a is a sectional view of an electronic device in a closed state according to another embodiment of this application.

Finally, refer to FIG. 13*a*. FIG. 13*a* is a sectional view of an electronic device according to another embodiment of this application. FIG. 13*a* is a sectional view at the first support plate 1052 of the electronic device in a closed state. It can be learned from descriptions of the foregoing embodiments that rotation of the second connecting member 10232 may drive the first support plate 1052 to rotate around the seventh rotating shaft 1017. In this application, a limiting structure may be disposed between the first support plate 1052 and the sliding block 1021, to align a surface of the first support plate 1052 with the second surface 2*b* of the first housing 2 when the electronic device is in an opened state, so that the first support plate 1052 and the second surface 2*b* of the first housing 2 are connected to form a flat surface. The limiting structure is disposed, so that a rotation position of the first support plate 1052 is limited when the electronic device is in the opened state.

Still refer to FIG. 13*a*. For example, the first support plate 1052 is provided with a first limiting portion 10521, the sliding block 1021 is provided with a second limiting portion 10212, and the first limiting portion 10521 is disposed to correspond to the second limiting portion 10212. In an embodiment, the first limiting portion 10521 may be a notch, and the second limiting portion 10212 may be a protruding portion. In this way, the protruding portion may be accommodated in the notch, so that the protruding portion is snapped into the notch to limit the rotation position of the first support plate 1052. Certainly, in some other embodiments of this application, the notch may alternatively be provided on the sliding block 1021, and the protruding portion may be disposed on the first support plate 1052. This can also limit the rotation position of the first support plate 1052. It may be understood that, a rotation position of the second support plate 1053 may also be limited by using a similar design.

Figure 13B:
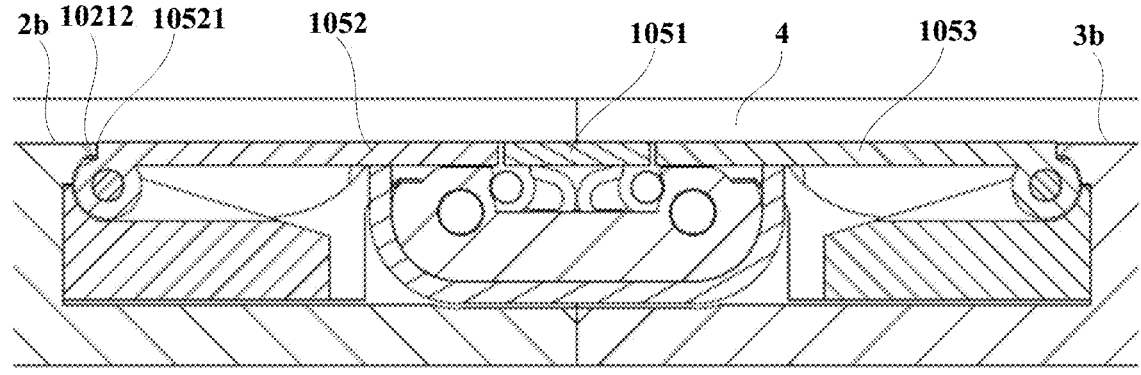
FIG. 13b is a sectional view of the electronic device shown in FIG. 13a in an opened state.

FIG. 13*b* is a sectional view of the electronic device shown in FIG. 13*a* in an opened state. In the opened state shown in FIG. 13*b*, when the first support plate 1052, the second support plate 1053, and the main shaft fastening plate 1051 form a flat surface, the first support plate 1052 can be connected to the second surface 2*b* of the first housing 2, and the second support plate 1053 can be connected to the second surface 3*b* of the second housing 3, to form a flat surface. Therefore, with the use of the electronic device provided in this application, the flexible display 4 can be fully supported when the electronic device is in the opened state. This can improve flatness of the flexible display 4, reduce deformation of the flexible display 4, and improve structure reliability of the entire electronic device.

With the use of the rotating shaft mechanism 1 provided in this application, because the first swing arm 102 and the second swing arm 103 are rotatably connected to the fastening member 101 by using physical shafts, rotation stability of the rotating shaft mechanism 1 can be improved. In addition, when the rotating shaft mechanism 1 provided in this application is used in the electronic device and the electronic device is in the opened state, the rotating shaft mechanism 1 may be hidden between the first housing 2 and the second housing 3, so that the electronic device has appearance effect of an integrated embodiment. The cover plate 105 of the rotating shaft mechanism 1, the first housing

2, and the second housing 3 may jointly form a flat support surface, to provide relatively full support for the flexible display 4, avoid collapse of the flexible display 4, and reduce deformation of the flexible display 4. In a process in which the first housing 2 and the second housing 3 of the electronic device rotate relative to each other, the display accommodation space formed between the first support plate 1052 and the second support plate 1053 can be adjusted through relative sliding of the sliding block and the corresponding swing rod of the length maintaining mechanism 1*a*, so that the display accommodation space meets the folding requirement of the flexible display, to prevent the flexible display 4 fastened to the first housing 2 and the second housing 3 from being squeezed or pulled, prolong the service life of the flexible display 4, and improve reliability of the electronic device.

Figure 14:
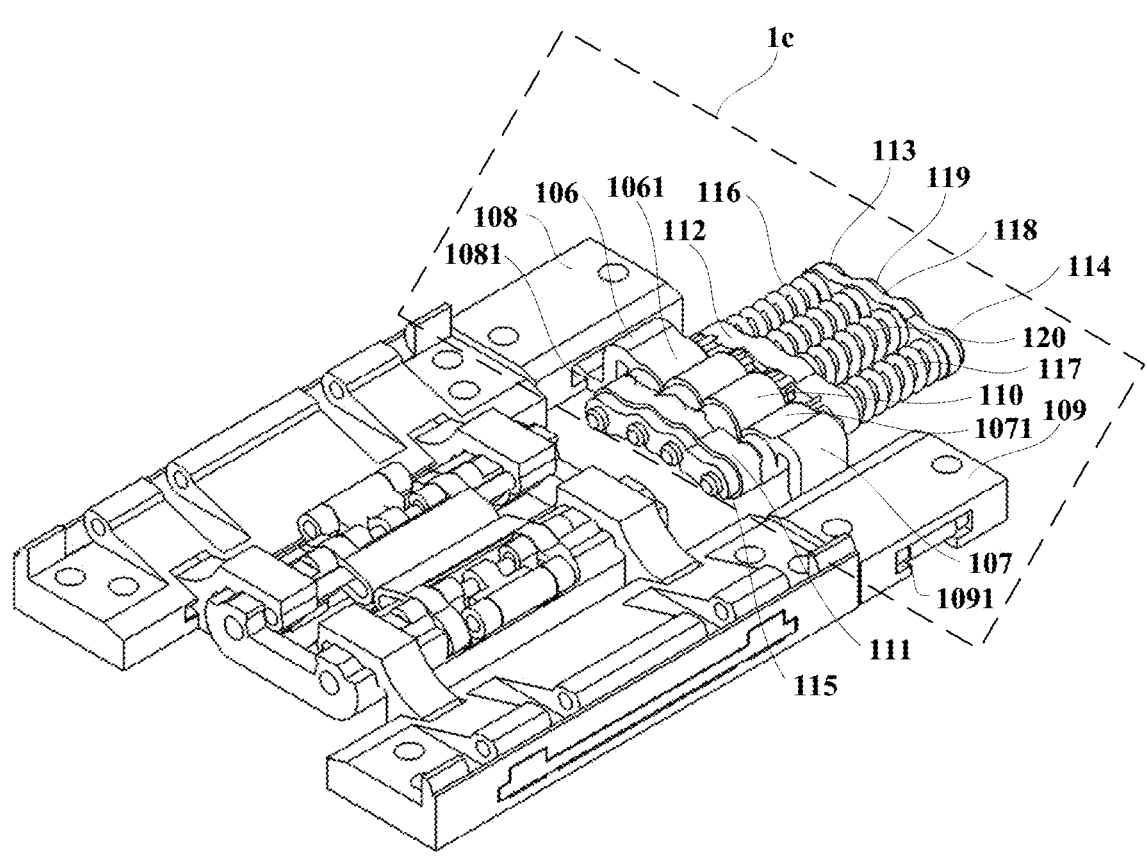
FIG. 14 is a schematic diagram of a partial structure of a rotating shaft mechanism according to an embodiment of this application.

In addition to the foregoing structures, in some embodiments of this application, the rotating shaft mechanism 1 may be further provided with another structure. For example, refer to FIG. 14. FIG. 14 is a schematic diagram of a partial structure of the rotating shaft mechanism 1 according to an embodiment of this application. In this embodiment, the rotating shaft mechanism 1 may further include a synchronous damper assembly 1*c*. The synchronous damper assembly 1*c* is disposed, so that the first housing 2 and the second housing 3 can rotate synchronously, to avoid applying instantaneous force to the flexible display. In addition, the synchronous damper assembly 1*c* can be configured to provide specific damping force in a process in which the first housing 2 and the second housing 3 rotate relative to each other, so that a user has a relatively obvious feeling of a folding or unfolding process of the electronic device. In addition, the synchronous damper assembly 1*c* is disposed, so that accidental opening or closing of the electronic device can also be avoided, and the two housings can suspend at specified positions.

Refer to both FIG. 3 and FIG. 14. In this application, there may be a plurality of synchronous damper assemblies 1*c*, the plurality of synchronous damper assemblies 1*c* are disposed at intervals in the length direction of the rotating shaft mechanism 1, and the plurality of synchronous damper assemblies 1*c* may also be accommodated in the accommodating groove 1041 of the housing 104 of the main shaft assembly 1*b*. In addition, a synchronous damper assembly 1*c* may be disposed in pairs with a length maintaining mechanism 1*a*, or may be separately disposed. For example, in the embodiment shown in FIG. 3, a synchronous damper assembly 1*c* and a length maintaining mechanism 1*a* may be disposed in pairs at each of two ends of the rotating shaft mechanism 1 in the length direction.

For an example disposition of the synchronous damper assembly 1*c*, still refer to FIG. 14. The synchronous damper assembly 1*c* includes a first rotating arm 106 and a second rotating arm 107. The first rotating arm 106 and the second rotating arm 107 may be symmetrically disposed, an end that is of the first rotating arm 106 and that faces the first housing 2 shown in FIG. 3 may be slidably connected to the first housing 2, and an end that is of the second rotating arm 107 and that faces the second housing 3 shown in FIG. 3 may be slidably connected to the second housing 3. As shown in FIG. 14, in some embodiments of this application, the synchronous damper assembly 1*c* may include a first fastening portion 108 and a second fastening portion 109. The first fastening portion 108 is fixedly connected to the first housing 2, and a connection manner thereof may be but is not limited to a threaded connection. The first fastening portion 108 is provided with a first cavity structure 1081, and the end that is of the first rotating arm 106 and that faces the first housing 2 may be accommodated in the first cavity structure 1081, and may slide along the first cavity structure 1081 in a direction toward or away from the first housing 2. Similarly, the second fastening portion 109 is fixedly connected to the second housing 3, and a connection manner thereof may be but is not limited to a threaded connection. The second fastening portion 109 is provided with a second cavity structure 1091, and the end that is of the second rotating arm 107 and that faces the second housing 3 may be accommodated in the second cavity structure 1091, and may slide along the second cavity structure 1091 in a direction toward or away from the second housing 3.

Figure 15:
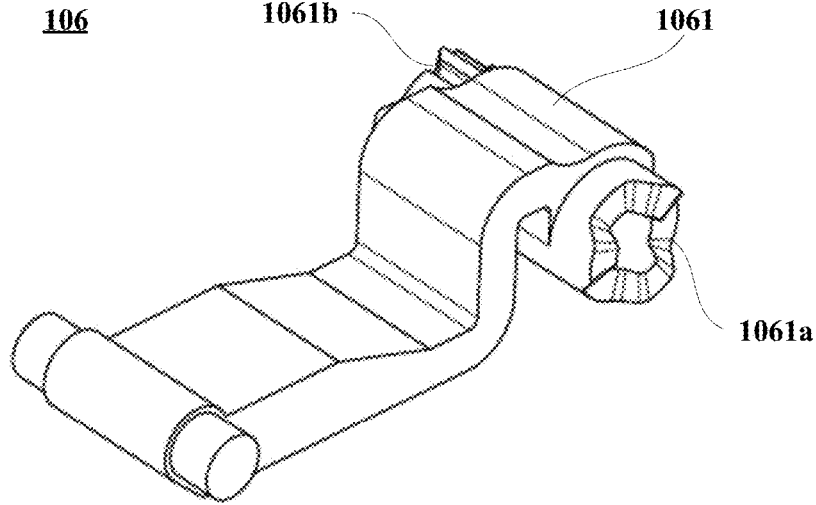
FIG. 15 is a schematic diagram of a structure of a first rotating arm according to an embodiment of this application.

In addition, refer to FIG. 15. FIG. 15 is a schematic diagram of a structure of the first rotating arm 106 according to an embodiment of this application. Refer to both FIG. 14 and FIG. 15. An end that is of the first rotating arm 106 and that faces the second rotating arm 107 is provided with a first gear 1061. Similarly, an end that is of the second rotating arm 107 and that faces the first rotating arm 106 is provided with a second gear 1071, and the first gear 1061 may be connected to the second gear 1071 through transmission. In this way, in a process in which the first housing 2 rotates relative to the second housing 3, rotation of the first gear 1061 may drive the second gear 1071 to rotate in a reverse direction, so that the first housing 2 and the second housing 3 rotate synchronously.

Still refer to FIG. 14. In this embodiment of this application, a driven gear 110 may be disposed between the first gear 1061 and the second gear 1071, and a quantity of driven gears 110 may be an even number. The first gear 1061 and the second gear 1071 are connected through transmission by using the driven gear 110, to provide rotation stability of the synchronous damper assembly 1c.

In addition, the synchronous damper assembly 1c may further include a first conjoined cam 111 and a second conjoined cam 112. In the length direction of the rotating shaft mechanism 1, the first gear 1061 and the second gear 1071 are located between the first conjoined cam 111 and the second conjoined cam 112. Still refer to FIG. 15. An end surface that is of the first gear 1061 and that faces the first conjoined cam 111 is provided with a first cam structure 1061a, and an end surface that is of the first gear 1061 and that faces the second conjoined cam 112 is provided with a second cam structure 1061b. Similarly, an end surface that is of the second gear 1071 and that faces the first conjoined cam 111 is provided with a first cam structure, and an end surface that is of the second gear 1071 and that faces the second conjoined cam 112 is provided with a second cam structure. In addition, an end surface that is of the first conjoined cam 111 and that faces the first gear 1061 and the second gear 1071 is provided with a first cam structure and a second cam structure, and an end surface that is of the second conjoined cam 112 and that faces the first gear 1061 and the second gear 1071 is provided with a first cam structure and a second cam structure. It should be noted that, in this application, a cam structure includes a plurality of protruding portions and concave portions. In two cam structures that are disposed opposite to each other, when a protruding portion of one cam structure is located in a concave portion of the other cam structure, the two cam structures engage with each other. In two cam structures that are disposed opposite to each other and that are of two cams, when a protruding portion of one cam structure is in contact with a protruding portion of the other cam structure, the two cam structures abut against each other.

The first cam structure 1061a of the first gear 1061 is disposed opposite to the first cam structure of the first conjoined cam 111, and the second cam structure 1061b of the first gear 1061 may be disposed opposite to the first cam structure of the second conjoined cam 112. The first cam structure of the second gear 1071 may be disposed opposite to the second cam structure of the first conjoined cam 111, and the second cam structure of the second gear 1071 may be disposed opposite to the second cam structure of the second conjoined cam 112.

Still refer to FIG. 14. The first gear 1061 is connected to the first conjoined cam 111 and the second conjoined cam 112 by using a first gear shaft 113. The first gear shaft 113 is disposed at an axis of a first cam structure, a second cam structure, the first cam structure, and a third cam to pass through the first gear 1061, the first conjoined cam 111, and the second conjoined cam 112. In addition, the second gear 1071 is connected to the first conjoined cam 111 and the second conjoined cam 112 by using a second gear shaft 114. The second gear shaft 114 is disposed at an axis of a first cam structure, a second cam structure, a second cam structure, and a fourth cam to pass through the first gear 1061, the first conjoined cam 111, and the second conjoined cam 112.

A side that is of the first conjoined cam 111 and that is away from the first gear 1061 and the second gear 1071 is provided with a first stopper 115, the first stopper 115 is fastened to the first gear shaft 113 and the second gear shaft 114, and the first stopper 115 may be but is not limited to a circlip. The first stopper 115 is disposed, so that the first conjoined cam 111 can be pressed against the first gear 1061 and the second gear 1071, and the first conjoined cam 111 can be prevented from falling off the first gear shaft 113 and the second gear shaft 114, to improve reliability of the rotating shaft mechanism 1.

In addition, a side that is of the second conjoined cam 112 and that is away from the first gear 1061 and the second gear 1071 is provided with a first elastic member 116 and a second elastic member 117, and the first elastic member 116 and the second elastic member 117 may be configured to press the second conjoined cam 112 against the first gear 1061 and the second gear 1071. For example, the first elastic member 116 and the second elastic member 117 may be springs, the first elastic member 116 may be sleeved on the first gear shaft 113, and the second elastic member 117 may be sleeved on the second gear shaft 114. Still refer to FIG. 14. A side that is of the first elastic member 116 and the second elastic member 117 and that is away from the second conjoined cam 112 may be provided with a second stopper 118, the second stopper 118 is fastened to the first gear shaft 113 and the second gear shaft 114, and the second stopper 118 may be but is not limited to a circlip. The second stopper 118 is disposed, so that the first elastic member 116 and the second elastic member 117 can be prevented from falling off the first gear shaft 113 and the second gear shaft 114, and the second conjoined cam 112 can be pressed against the first gear 1061 and the second gear 1071.

In this way, in a process in which the first rotating arm 106 and the second rotating arm 107 rotate with the first housing 2 and the second housing 3 relative to each other, cam structures of the first gear 1061 and the second gear 1071 and corresponding cam structures of the first conjoined cam 111 and the second conjoined cam 112 may switch between an engaged state and an abutting state. Because the first elastic member 116 and the second elastic member 117 may apply elastic force to the second connecting member 10232 to press the second conjoined cam 112 to the first gear 1061 and the second gear 1071, when cam structures that are disposed opposite to each other are in the engaged state or the abutting state, even if external force is removed, the second conjoined cam 112 can still be kept at a corresponding rotation position under the elastic force of the elastic members and friction force between the second conjoined cam 112 and cam structures of the first gear 1061 and the second gear 1071, so that the first rotating arm 106 and the second rotating arm 107 can suspend at corresponding rotation positions.

Still refer to FIG. 14. In some embodiments of this application, cam structures may be disposed on end surfaces that are of the driven gear 110 and that face the first conjoined cam 111 and the second conjoined cam 112, and cam structures are also disposed on corresponding positions on the first conjoined cam 111 and the second conjoined cam 112, so that the driven gear 110 can be connected to the first conjoined cam 111 and the second conjoined cam 112 by using matched cam structures. In addition, an intermediate gear shaft 119 may be disposed at an axis of the matched cam structures of the driven gear 110, the first conjoined cam 111, and the second conjoined cam 112, and the intermediate gear shaft 119 may be disposed to pass through the driven gear 110, the first conjoined cam 111, and the second conjoined cam 112. In addition, a third elastic member 120 may be sleeved on the intermediate gear shaft 119. For an example disposition of the third elastic member 120, refer to the first elastic member 116 and the second elastic member 117. In this way, the third elastic member 120 applies elastic force to press the second conjoined cam 112 to the first gear 1061 and the second gear 1071. This helps increase damping force in a process in which the first rotating arm 106 and the second rotating arm 107 of the synchronous damper assembly 1c rotate relative to each other, and improve movement stability of the rotating shaft mechanism 1.

Figure 16:
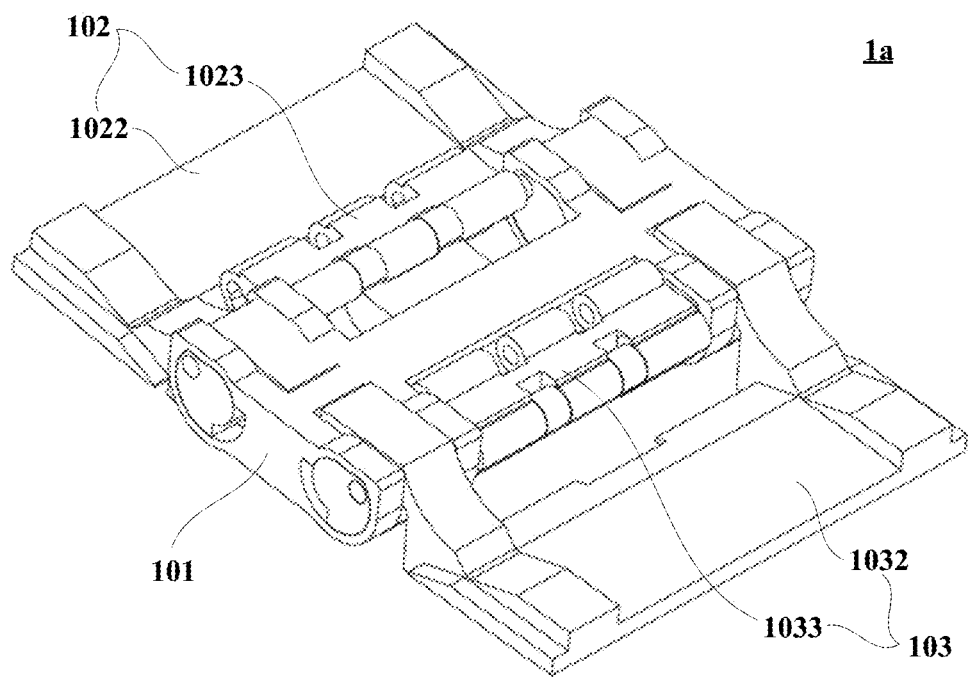
FIG. 16 is a schematic diagram of a structure of a length maintaining mechanism according to another embodiment of this application.

In addition to the disposition manners provided in the foregoing embodiments, the length maintaining mechanism 1a of the rotating shaft mechanism 1 provided in this application may alternatively be disposed in another manner. For example, refer to FIG. 16. FIG. 16 is a schematic diagram of a structure of the length maintaining mechanism 1a according to another embodiment of this application. In this embodiment, the length maintaining mechanism 1a includes a fastening member 101, a first swing arm 102, and a second swing arm 103. The first swing arm 102 and the second swing arm 103 are disposed on two sides of the fastening member 101, and may be rotatably connected to the fastening member 101. The first swing arm 102 includes a sliding block 1021, a swing rod 1022, and a connecting assembly 1023, and the second swing arm 103 includes a sliding block 1031, a swing rod 1032, and a connecting assembly 1033. It should be noted that, the sliding block 1021 and the sliding block 1031 are not shown in FIG. 16, and may be disposed with reference to the sliding block 1021 and the sliding block 1031 in the length maintaining mechanism 1a in embodiments shown in FIG. 4 and FIG. 5.

Figure 17:
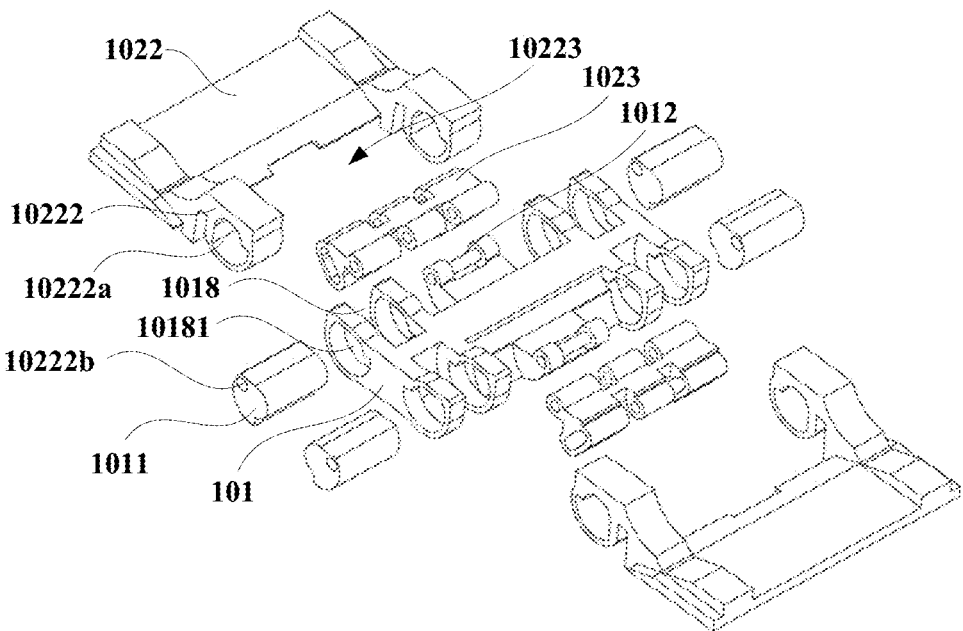
FIG. 17 is an exploded view of a length maintaining mechanism according to another embodiment of this application.

In addition, refer to FIG. 17. FIG. 17 is an exploded view of the length maintaining mechanism 1a shown in FIG. 16. In this embodiment, an end that is of the swing rod 1022 and that faces the fastening member 101 may be rotatably connected to the fastening member 101. For example, the swing rod 1022 is provided with a first mounting hole 10222a. However, different from the foregoing embodiments, in this embodiment, the first mounting hole 10222a of the swing rod 1022 is a special-shaped hole. In addition, the fastening member 101 is provided with a first mounting groove 1018. In a length direction of the rotating shaft mechanism 1, each of two groove walls of the first mounting groove 1018 that are disposed opposite to each other is provided with one groove hole 10181, and the swing rod 1022 and the fastening member 101 are rotatably connected by using a first rotating shaft 1011 that passes through the first mounting hole 10222a and the groove hole 10181.

It should be noted that, in this embodiment, a shape of a cross section of the first rotating shaft 1011 is the same as a shape of the first mounting hole a. In this case, the cross section of the first rotating shaft 1011 is a special-shaped cross section, so that the first rotating shaft 1011 can rotate synchronously with the swing rod 1022. In addition, the groove hole 10181 provided on the groove wall of the first mounting groove 1018 may also be a special-shaped hole. The first rotating shaft 1011 may rotate in the groove hole 10181, and a rotation position of the first rotating shaft 1011 can be adjusted by adjusting the shape of the cross section of the first rotating shaft 1011 and a shape of the groove hole 10181.

Still refer to FIG. 17. The swing rod 1022 may be provided with two rotating portions 10222, and the two rotating portions 10222 are disposed at an interval in the length direction of the rotating shaft mechanism 1, to form first mounting space 10223 between the two rotating portions 10222. The swing rod 1022 is rotatably connected to the fastening member 101 by using the two rotating portions 10222. This can help improve stability of rotation of the swing rod 1022 around the fastening member 101.

At least a part of a first connecting member 10231 of the connecting assembly 1023 may be accommodated in the first mounting space 10223 between the two rotating portions 10222 of the swing rod 1022. In this way, a structure of the rotating shaft mechanism 1 can be compact. Different from the foregoing embodiments, in this embodiment, the connecting assembly 1023 is of an integrated structure.

Figure 18:
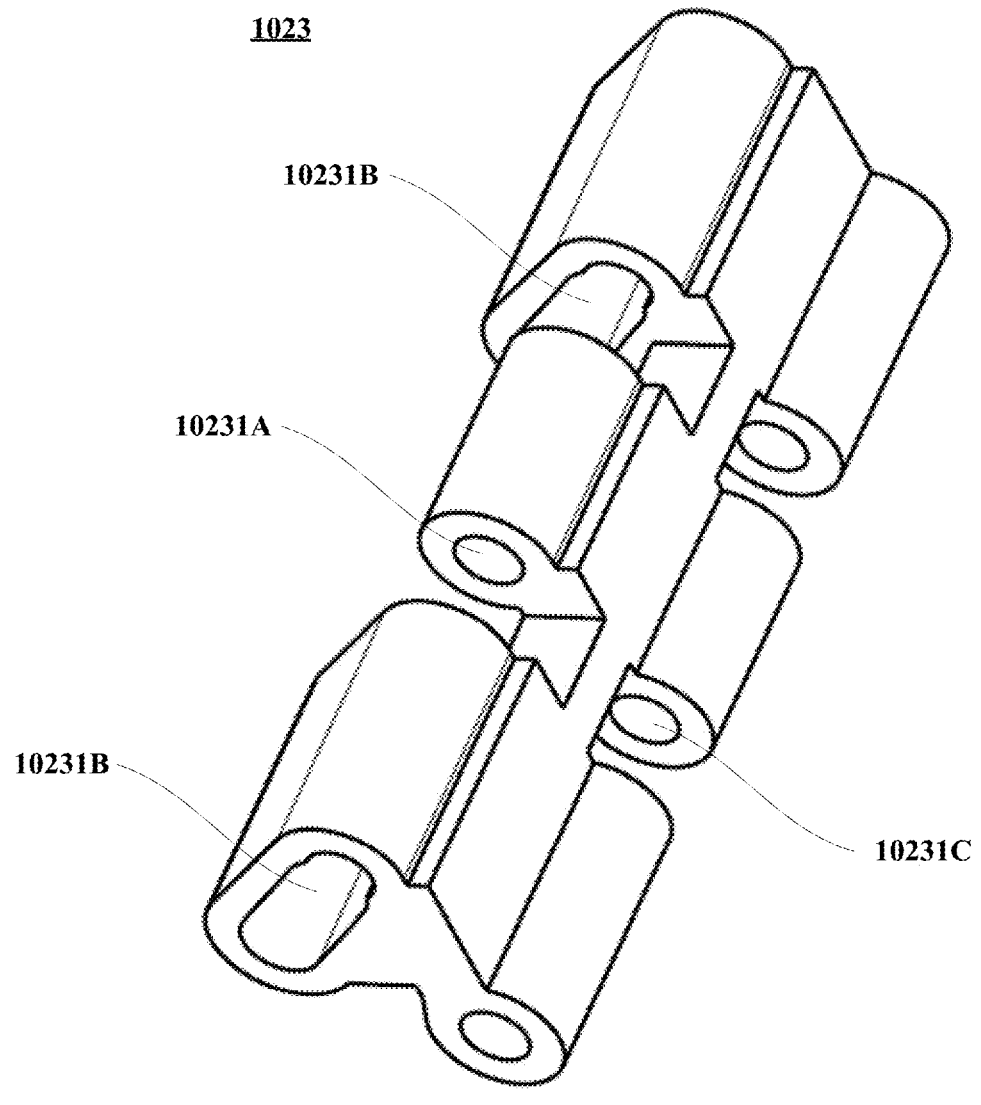
FIG. 18 is a schematic diagram of a structure of a first connecting assembly according to another embodiment of this application.

FIG. 18 is a schematic diagram of a structure of the connecting assembly 1023 according to an embodiment of this application. The connecting assembly 1023 is provided with a first mounting hole 10231A, the first mounting hole 10231 may be a round hole, and the first mounting hole 10231A may be rotatably connected to the fastening member 101 by using a second rotating shaft 1012 shown in FIG. 17.

In addition, the connecting assembly 1023 is further provided with a second mounting hole 10231B, and the second mounting hole 10231B is a long hole. Refer to both FIG. 17 and FIG. 18. The connecting assembly 1023 is provided with two mounting holes 10231B. In the length direction of the rotating shaft mechanism 1, the two second connecting holes 10231B are located on two sides of the first mounting hole 10231A. Refer to FIG. 17. The first rotating shaft 1011 is provided with a second mounting hole 10222b, and the second mounting hole 10222b is connected to the second mounting hole 10231B of the connecting assembly 1023 by using a third rotating shaft (not shown in FIG. 17). The third rotating shaft may be but is not limited to a pin, and the third rotating shaft may pass through the second mounting hole 10222b and the second mounting hole 10231B of the connecting assembly 1023. In this way, in a process in which the swing rod 1022 rotates around the first rotating shaft 1011 of the fastening member 101, the third rotating shaft may slide along the second mounting hole 10231B of the connecting assembly 1023, so that the connecting assembly 1023 is driven to rotate around the second rotating shaft 1012. It may be understood that, in this application, a rotation track of the connecting assembly 1023 can be adjusted by adjusting a long axis direction of the second mounting hole 10231B.

Still refer to FIG. 18. The connecting assembly 1023 may be further provided with a third mounting hole 10231C, and there may be one or more third mounting holes 10231C. When the rotating shaft mechanism 1 provided in this embodiment is used in the electronic device, the third mounting hole 10231C of the connecting assembly 1023 may be configured to be rotatably connected to an end part that is of the first support plate 1052 shown in FIG. 9 and that faces the fastening member 101. In this way, in a process in which the connecting assembly 1023 rotates around the second rotating shaft 1012, the first support plate 1052 is driven to move in a direction toward a main shaft fastening plate 1051.

In addition, because an end that is of the first support plate 1052 and that is away from the main shaft fastening plate 1051 is rotatably connected to the sliding block 1021, and the sliding block 1021 is fixedly connected to the first housing 2, in a process in which the first support plate 1052 moves in the direction toward the main shaft fastening plate 1051, the sliding block 1021 may be driven to slide relative to the swing rod 1022, so that a distance between the first housing 2 and the fastening member 101 can be adjusted by adjusting a sliding distance.

It may be understood that, in this embodiment of this application, for a an example disposition manner of the second swing arm 103, refer to the first swing arm 102. Details are not described herein again. In addition, other structures of the rotating shaft mechanism 1 provided in this embodiment may be disposed with reference to the foregoing embodiments. For example, the rotating shaft mechanism 1 in this embodiment may also include a main shaft assembly 1b, and the length maintaining mechanism 1a may be accommodated in the main shaft assembly 1b. In addition, the rotating shaft mechanism 1 may be further provided with a damper mechanism. Details are not described herein again.

With the use of the rotating shaft mechanism 1 provided in this embodiment of this application, because the first swing arm 102 and the second swing arm 103 are rotatably connected to the fastening member 101 by using physical shafts, rotation stability of the rotating shaft mechanism 1 can be improved. In addition, when the rotating shaft mechanism 1 provided in this application is used in the electronic device and the electronic device is in an opened state, the rotating shaft mechanism 1 may be hidden between the first housing 2 and the second housing 3, so that the electronic device has appearance effect of an integrated embodiment. In addition, a cover plate 105 of the rotating shaft mechanism 1, the first housing 2, and the second housing 3 may jointly form a flat support surface, to provide relatively full support for a flexible display 4, avoid collapse of the flexible display 4, and reduce deformation of the flexible display 4. In a process in which the first housing 2 and the second housing 3 of the electronic device rotate relative to each other, display accommodation space formed between the first support plate 1052 and a second support plate 1053 can be adjusted through relative sliding of the sliding block and the corresponding swing rod of the length maintaining mechanism 1a, so that the display accommodation space meets a folding requirement of the flexible display, to prevent the flexible display 4 fastened to the first housing 2 and the second housing 3 from being squeezed or pulled, prolong a service life of the flexible display 4, and improve reliability of the electronic device.

It is clear that a person skilled in the art can make various modifications and variations to this application without departing from the protection scope of this application. This application is intended to cover these modifications and variations of this application provided that they fall within the scope defined by the claims of this application and their equivalent technologies.

What is claimed is:

1. A rotating shaft mechanism comprising:
   a length maintaining mechanism, the length maintaining mechanism including:
   a fastening member and two swing arms respectively disposed on two sides of the fastening member, and are rotatably connected to the fastening member, each swing arm including a sliding block, a swing rod, and a connecting assembly, wherein:
   the sliding block is provided with a sliding slot;
   the swing rod is accommodated in the sliding slot and is capable of sliding in the sliding slot in a direction toward or away from the fastening member, and an end that is of the swing rod and that is away from the sliding block is rotatably connected to the fastening member;
   the connecting assembly is located on a side that is of the swing rod and that faces the fastening member,
   the connecting assembly is rotatably connected to the fastening member, and
   the swing rod is capable of driving the connecting assembly to rotate relative to the fastening member by rotating relative to the fastening member; and
   a main shaft assembly including:
   a cover plate having two support plates, each support plate covering the swing arm on a corresponding side, wherein:
   an end of each support plate and facing the fastening member is rotatably connected to the connecting assembly, and
   an end of each support plate and away from the fastening member is rotatably connected to the sliding block; and
   each connecting assembly is operable to cause the support plate to rotate relative to the sliding block by rotating relative to the fastening member, and to cause each support plate to move in a direction toward or away from the fastening member.

2. The rotating shaft mechanism according to claim 1, wherein each swing rod is provided with a protrusion, the sliding slot is provided with a sliding rail, the protrusion is accommodated in the sliding rail, and the protrusion is capable of sliding in the sliding rail in a direction toward or away from the fastening member.

3. The rotating shaft mechanism according to claim 1, wherein an end that is of each swing rod and that is away from the sliding block is provided with a rotating portion, the fastening member is provided with a first rotating shaft, and the rotating portion is rotatably connected to the fastening member by using the first rotating shaft.

4. The rotating shaft mechanism according to claim 3, wherein each swing rod comprises two rotating portions, the two rotating portions are disposed at an interval in a length direction of the rotating shaft mechanism, the two connecting portions form first mounting space, and at least a part of the connecting assembly is accommodated in the first mounting space.

5. The rotating shaft mechanism according to claim 3, wherein each connecting assembly comprises a first connecting member and a second connecting member, the second connecting member is located between the first connecting member and the swing rod, the fastening member is further provided with a second rotating shaft, and the first connecting member is rotatably connected to the second rotating shaft; and the first connecting member is provided with a first long hole and a second long hole, the second rotating shaft is located between the first long hole and the second long hole, and the first long hole is located, relative to the second long hole, at an end that is of the first connecting member and that faces the fastening member; and the rotating portion is connected to the first connecting member by using a third rotating shaft that passes through the first long hole, wherein when the rotating portion rotates around the first rotating shaft, the third rotating shaft is capable of sliding along the first long hole, to drive the first connecting member to rotate around the second rotating shaft.

6. The rotating shaft mechanism according to claim 5, wherein the fastening member is further provided with a fourth rotating shaft, the second connecting member is rotatably connected to the fourth rotating shaft, and the second connecting member is connected to the first connecting member by using a fifth rotating shaft that passes through the second long hole, wherein when the first connecting member rotates around the second rotating shaft, the fifth rotating shaft is capable of sliding along the second long hole, to drive the second connecting member to rotate around the fourth rotating shaft; and the second connecting member is rotatably connected, by using a sixth rotating shaft, to an end part that is of the support plate and that faces the fastening member, wherein when the second connecting member rotates around the fourth rotating shaft, the support plate is driven to rotate relative to the sliding block, so that the support plate is driven to move in a direction toward or away from the fastening member.

7. The rotating shaft mechanism according to claim 5, wherein an end part that is of the first connecting member and that is away from the fastening member is provided with a connecting portion, and the connecting portion is rotatably connected to the second rotating shaft.

8. The rotating shaft mechanism according to claim 7, wherein the first connecting member comprises two connecting portions, the two connecting portions are disposed at an interval in the length direction of the rotating shaft mechanism, the two connecting portions form second mounting space, and at least a part of the second connecting member is accommodated in the second mounting space.

9. The rotating shaft mechanism according to claim 3, wherein the fastening member is further provided with a second rotating shaft, and the connecting assembly is rotatably connected to the second rotating shaft; and the connecting assembly is provided with a long hole, the rotating portion is connected to the connecting assembly by using a third rotating shaft, and the third rotating shaft passes through the first rotating shaft and the long hole, wherein when the rotating portion rotates, the third rotating shaft is capable of sliding along the long hole, to drive the connecting assembly to rotate around the second rotating shaft.

10. The rotating shaft mechanism according to claim 9, wherein the connecting assembly comprises two long holes, and in the length direction of the rotating shaft mechanism, the second rotating shaft is located between the two long holes; and there are two rotating portions, and in the length direction of the rotating shaft mechanism, the two rotating portions are respectively connected to the two long holes in a one-to-one correspondence by using the third rotating shaft.

11. The rotating shaft mechanism according to claim 9, wherein the connecting assembly is rotatably connected to an end part that is of the support plate and that faces the fastening member, wherein when the connecting assembly rotates around the second rotating shaft, the support plate is driven to rotate relative to the sliding block, so that the support plate is driven to move in a direction toward or away from the fastening member.

12. The rotating shaft mechanism according to claim 9, wherein the rotating portion rotates synchronously with the first rotating shaft, and a cross section of the first rotating shaft is a special-shaped cross section.

13. The rotating shaft mechanism according to claim 1, wherein the main shaft assembly further comprises a housing, the housing is provided with an accommodating groove, and the length maintaining mechanism is accommodated in the accommodating groove; and wherein the cover plate further comprises a main shaft fastening plate, the main shaft fastening plate is fastened to the fastening member, the two support plates are respectively disposed on two sides of the main shaft fastening plate, and the fastening member is located between the housing and the main shaft fastening plate.

14. An electronic device comprising:
a rotating shaft mechanism including:
a length maintaining mechanism, the length maintaining mechanism including:
a fastening member and two swing arms respectively disposed on two sides of the fastening member, and are rotatably connected to the fastening member, each swing arm including a sliding block, a swing rod, and a connecting assembly, wherein:
the sliding block is provided with a sliding slot;
the swing rod is accommodated in the sliding slot and is capable of sliding in the sliding slot in a direction toward or away from the fastening member, and an end that is of the swing rod and that is away from the sliding block is rotatably connected to the fastening member;
the connecting assembly is located on a side that is of the swing rod and that faces the fastening member,
the connecting assembly is rotatably connected to the fastening member, and
the swing rod is capable of driving the connecting assembly to rotate relative to the fastening member by rotating relative to the fastening member; and
a main shaft assembly including:
a cover plate having two support plates, each support plate covering the swing arm on a corresponding side, wherein:
an end of each support plate and facing the fastening member is rotatably connected to the connecting assembly, and
an end of each support plate and away from the fastening member is rotatably connected to the sliding block; and
each connecting assembly is operable to cause the support plate to rotate relative to the sliding block by rotating relative to the fastening member, and to cause each support plate to move in a direction toward or away from the fastening member;

two housings respectively disposed on two sides of the rotating shaft mechanism, and the sliding block of the swing arm of the length maintaining mechanism is fixedly connected to the housing on a corresponding side; and a flexible display continuously covering the two housings and the rotating shaft mechanism, and the flexible display is fixedly connected to the two housings.

15. The electronic device according to claim 14, wherein an end part that is of each housing and that faces the fastening member is provided with an opening groove, and the sliding block is located in the opening groove on a corresponding side, and is fixedly connected to a groove wall of the opening groove; and wherein when the electronic device is in an opened state, the rotating shaft mechanism is hidden in an accommodating portion that is formed by the two opening grooves of the two housings through alignment and combination.

16. The electronic device according to claim 14, wherein each swing rod is provided with a protrusion, the sliding slot is provided with a sliding rail, the protrusion is accommodated in the sliding rail, and the protrusion is capable of sliding in the sliding rail in a direction toward or away from the fastening member.

17. The electronic device according to claim 14, wherein an end that is of each swing rod and away from the sliding block is provided with a rotating portion, the fastening member is provided with a first rotating shaft, and the rotating portion is rotatably connected to the fastening member by using the first rotating shaft.

18. The electronic device according to claim 17, wherein each swing rod comprises two rotating portions disposed at an interval in a length direction of the rotating shaft mechanism, the two connecting portions form first mounting space, and at least a part of the connecting assembly is accommodated in the first mounting space.

19. The electronic device according to claim 17, wherein each connecting assembly comprises a first connecting member and a second connecting member, the second connecting member is located between the first connecting member and the swing rod, the fastening member is further provided with a second rotating shaft, and the first connecting member is rotatably connected to the second rotating shaft; and the first connecting member is provided with a first long hole and a second long hole, the second rotating shaft is located between the first long hole and the second long hole, and the first long hole is located, relative to the second long hole, at an end that is of the first connecting member and that faces the fastening member; and the rotating portion is connected to the first connecting member by using a third rotating shaft that passes through the first long hole, wherein when the rotating portion rotates around the first rotating shaft, the third rotating shaft is capable of sliding along the first long hole, to drive the first connecting member to rotate around the second rotating shaft.

20. The electronic device according to claim 19, wherein the fastening member is further provided with a fourth rotating shaft, the second connecting member is rotatably connected to the fourth rotating shaft, and the second connecting member is connected to the first connecting member by using a fifth rotating shaft that passes through the second long hole, wherein when the first connecting member rotates around the second rotating shaft, the fifth rotating shaft is capable of sliding along the second long hole, to drive the second connecting member to rotate around the fourth rotating shaft; and the second connecting member is rotatably connected, by using a sixth rotating shaft, to an end part that is of the support plate and that faces the fastening member, wherein when the second connecting member rotates around the fourth rotating shaft, the support plate is driven to rotate relative to the sliding block, so that the support plate is driven to move in a direction toward or away from the fastening member.

* * * * *